(12) United States Patent
Barber et al.

(10) Patent No.: US 10,853,337 B2
(45) Date of Patent: Dec. 1, 2020

(54) LIFECYCLE TRANSITION VALIDATION FOR STORAGE OBJECTS

(71) Applicant: Amazon Technologies, Inc., Seattle, WA (US)

(72) Inventors: Jeffrey Michael Barber, Seattle, WA (US); Praveen Kumar Gattu, Redmond, WA (US); Derek Ernest Denny-Brown, II, Seattle, WA (US); Christopher Henning Elving, Sunnyvale, CA (US); Carl Yates Perry, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 221 days.

(21) Appl. No.: 15/602,017

(22) Filed: May 22, 2017

(65) Prior Publication Data
US 2017/0255589 A1  Sep. 7, 2017

Related U.S. Application Data

(63) Continuation of application No. 13/715,863, filed on Dec. 14, 2012, now Pat. No. 9,658,983.

(51) Int. Cl.
*G06F 16/2458* (2019.01)
*G06F 16/21* (2019.01)

(52) U.S. Cl.
CPC .................. *G06F 16/219* (2019.01)

(58) Field of Classification Search
CPC ... G06F 15/167; G06F 16/219; G06F 16/2474
See application file for complete search history.

(56) References Cited

U.S. PATENT DOCUMENTS

| 7,007,048 B1 | 2/2006 | Murray et al. |
| 7,711,711 B1 | 5/2010 | Linnell et al. |
| 7,716,180 B2 * | 5/2010 | Vermeulen .............. H04L 67/42 707/626 |

(Continued)

OTHER PUBLICATIONS

U.S. Appl. No. 13/715,898, filed Dec. 14, 2012, Jeffrey Michael Barber et al.

(Continued)

*Primary Examiner* — Lance Leonard Barry
(74) *Attorney, Agent, or Firm* — Robert C. Kowert; Kowert, Hood, Munyon, Rankin & Goetzel, P.C.

(57) ABSTRACT

Methods and apparatus for lifecycle support for storage objects are disclosed. A storage medium stores program instructions that when executed on a processor implement a storage lifecycle manager of a multi-tenant storage service. The lifecycle manager determines a lifecycle policy to be implemented for a storage object. The policy indicates lifecycle transitions of the object, including a transition from a first service level to a second service level. The first service level and the second service level may each specify a maximum number of versions of the storage object. The lifecycle manager initiates modification operations corresponding to the storage object's data in accordance with the lifecycle policy, and verifies that the modification operations succeeded. The lifecycle manager provides, in response to a query, an indication of a current service level of the storage object.

20 Claims, 20 Drawing Sheets

(56) References Cited

U.S. PATENT DOCUMENTS

| | | | |
|---|---|---|---|
| 7,769,722 B1* | 8/2010 | Bergant | G06F 16/184 |
| | | | 707/681 |
| 7,958,093 B2 | 6/2011 | Anderson et al. | |
| 7,979,649 B1 | 7/2011 | Thiam et al. | |
| 7,987,325 B1 | 7/2011 | Patil et al. | |
| 8,006,061 B1 | 8/2011 | Chatterjee et al. | |
| 8,229,897 B2* | 7/2012 | Cannon | G06F 11/1451 |
| | | | 707/644 |
| 8,316,197 B1* | 11/2012 | Parker | G06F 16/125 |
| | | | 711/162 |
| 8,806,296 B1* | 8/2014 | Lazier | G06F 3/0604 |
| | | | 714/763 |
| 8,868,710 B2* | 10/2014 | Schultze | H04L 41/00 |
| | | | 709/223 |
| 9,658,983 B1 | 5/2017 | Barber et al. | |
| 2005/0132010 A1 | 6/2005 | Muller | |
| 2006/0004847 A1* | 1/2006 | Claudatos | G06Q 10/10 |
| 2006/0259813 A1* | 11/2006 | Ushijima | G06F 16/367 |
| | | | 714/6.12 |
| 2006/0259901 A1 | 11/2006 | Kaplan | |
| 2007/0180115 A1* | 8/2007 | Bahrs | G06F 9/54 |
| | | | 709/226 |
| 2007/0299879 A1 | 12/2007 | Dao et al. | |
| 2008/0177802 A1 | 7/2008 | Haye et al. | |
| 2008/0177810 A1 | 7/2008 | Devarakonda et al. | |
| 2008/0263112 A1 | 10/2008 | Shaath et al. | |
| 2009/0216796 A1* | 8/2009 | Slik | G06F 16/164 |
| 2009/0234880 A1* | 9/2009 | Madhavarapu | G06F 16/13 |
| 2010/0332401 A1* | 12/2010 | Prahlad | G06F 3/0649 |
| | | | 705/80 |
| 2011/0029729 A1 | 2/2011 | Zwisler et al. | |
| 2011/0225361 A1 | 9/2011 | Resch et al. | |
| 2011/0276539 A1 | 11/2011 | Thiam | |
| 2011/0314069 A1* | 12/2011 | Alatorre | G06F 16/122 |
| | | | 707/827 |
| 2012/0123999 A1* | 5/2012 | Ashutosh | G06F 11/1453 |
| | | | 707/618 |
| 2012/0173488 A1 | 7/2012 | Spielberg et al. | |
| 2012/0233418 A1 | 9/2012 | Barton et al. | |
| 2012/0317358 A1* | 12/2012 | Ando | G06F 3/0605 |
| | | | 711/117 |
| 2012/0328259 A1* | 12/2012 | Seibert, Jr. | G06F 17/212 |
| | | | 386/230 |
| 2012/0331016 A1* | 12/2012 | Janson | G06F 16/25 |
| | | | 707/809 |
| 2013/0132800 A1* | 5/2013 | Healey, Jr. | G06F 3/0607 |
| | | | 714/769 |

OTHER PUBLICATIONS

U.S. Appl. No. 13/715,889, filed Dec. 14, 2012, Jeffrey Michael Barber et al.
U.S. Appl. No. 13/718,883, filed Dec. 14, 2012, Jeffrey Michael Barber et al.
U.S. Appl. No. 13/715,867, filed Dec. 14, 2012, Jeffrey Michael Barber et al.
U.S. Appl. No. 13/715,844, filed Dec. 14, 2012, Jeffrey Michael Barber et al.
U.S. Appl. No. 13/715,850, filed Dec. 14, 2012, Jeffrey Michael Barber et al.

* cited by examiner

```
PUT /?lifeCycleDefinition HTTP/1.1
Host: lcservicename.webserver.com
Date: Date
Authorization: Signature
<LCConfiguration>
   <ServiceLevel>
      <ID>1</ID>
      <Durability>99.999999</Durability>
   </ServiceLevel>
   <ServiceLevel>
      <ID>2</ID>
      <Durability>99.9999</Durability>
   </ServiceLevel>
   <ServiceLevel>
      <ID>3</ID>
      <Durability>99.99</Durability>
   </ServiceLevel>
   <TransitionRule>
      <ID>xxxx</ID>
      <Prefix>prefix1/abc</Prefix>
      <Status>Enabled</Status>
      <From-servicelevel>1</From-servicelevel>
      <To-servicelevel>3</To-service-level>
      <TransitionCriterion>
         <Type>ElapsedTimeSinceCreation</Type>
         <Units>Days</Units>
         <Count>365</Count>
      </TransitionCriterion>
   </TransitionRule>
   ...
</LCConfiguration>
```

LIFECYCLE TRANSITION VALIDATION FOR STORAGE OBJECTS

This application is a continuation of U.S. patent application Ser. No. 13/715,863, filed Dec. 14, 2012, now U.S. Pat. No. 9,658,983, which is hereby incorporated by reference herein in its entirety.

BACKGROUND

Computing applications typically rely on some type of storage medium for the persistent storage of various kinds of application data. For example, common office applications and multimedia applications generate and use application data of various types and formats, such as documents, spreadsheets, still images, audio and video data, among others. Frequently, such data is stored for repeated access or use on behalf of a user, or for shared use by multiple users such as employees of a particular department of a business organization. Users may wish to store and work with a number of documents or other data over a period of time, and may expect that the data will be readily available in a predictable state when needed. In many computing systems, the storage medium used by applications for persistent application data storage is most commonly a magnetic fixed drive or "hard" drive, although optical and solid-state storage devices are also used. Such devices are either integrated within a computer system that executes the applications or accessible to that system via a local peripheral interface or a network. Typically, devices that serve as application storage are managed by an operating system that manages device-level behavior to present a consistent storage interface, such as a file system interface, to various applications needing storage access.

This conventional model of application storage presents several limitations. First, it generally limits the accessibility of application data. For example, if application data is stored on the local hard drive of a particular computer system, it may be difficult to access by applications executing on other systems. Even if the data is stored on a network-accessible device, applications that execute on systems outside the immediate network may not be able to access that device. For example, for security reasons, enterprises commonly restrict access to their local area networks (LANs) such that systems external to the enterprise cannot access systems or resources within the enterprise. Thus, applications that execute on portable devices (e.g., notebook or handheld computers, personal digital assistants, mobile telephony devices, etc.) may experience difficulty accessing data that is persistently associated with fixed systems or networks.

The conventional application storage model also may fail to adequately ensure the reliability of stored data. For example, conventional operating systems typically store one copy of application data on one storage device by default, requiring a user or application to generate and manage its own copies of application data if data redundancy is desired. While individual storage devices or third-party software may provide some degree of redundancy, these features may not be consistently available to applications, as the storage resources available to applications may vary widely across application installations. The operating-system-mediated conventional storage model may also limit the cross-platform accessibility of data. For example, different operating systems may store data for the same application in different, incompatible formats, which may make it difficult for users of applications executing on one platform (e.g., operating system and underlying computer system hardware) to access data stored by applications executing on different platforms.

To address some of these limitations, in recent years some organizations have taken advantage of virtualization technologies and the falling costs of commodity hardware to set up large-scale network-accessible multi-tenant storage services for many customers with diverse needs, allowing various storage resources to be efficiently, reliably and securely shared by multiple customers. For example, virtualization technologies may allow a single physical storage device (such as a disk array) to be shared among multiple users by providing each user with one or more virtual storage devices hosted by the single physical storage device, providing each user with the illusion that they are the sole operators and administrators of a given hardware storage resource. Furthermore, some virtualization technologies may be capable of providing virtual resources that span two or more physical resources, such as a single large virtual storage device that spans multiple distinct physical devices.

For many applications and clients of such storage services, access requirements for a given storage object may change over time. For example, a document prepared for a meeting presentation may be accessed very frequently prior to the meeting (e.g., during various editing sessions by different collaborating authors), and for some time after the meeting, but the document may not be read or written very frequently six months after the meeting. Similarly, prior to the meeting, the impact on the customer of losing a particular version of the document as it is undergoing editing revisions may be much higher than after the meeting. Given that the pace at which data is generated for storage in such storage services has accelerated rapidly, the costs of supporting the highest-possible access performance, availability and/or durability for all storage objects regardless of the relative importance of the objects may eventually become prohibitive for at least some clients.

BRIEF DESCRIPTION OF DRAWINGS

FIG. 12 illustrates example elements of a lifecycle policy that may be specified by a client using a programmatic interface, according to at least some embodiments.

Figure 1:
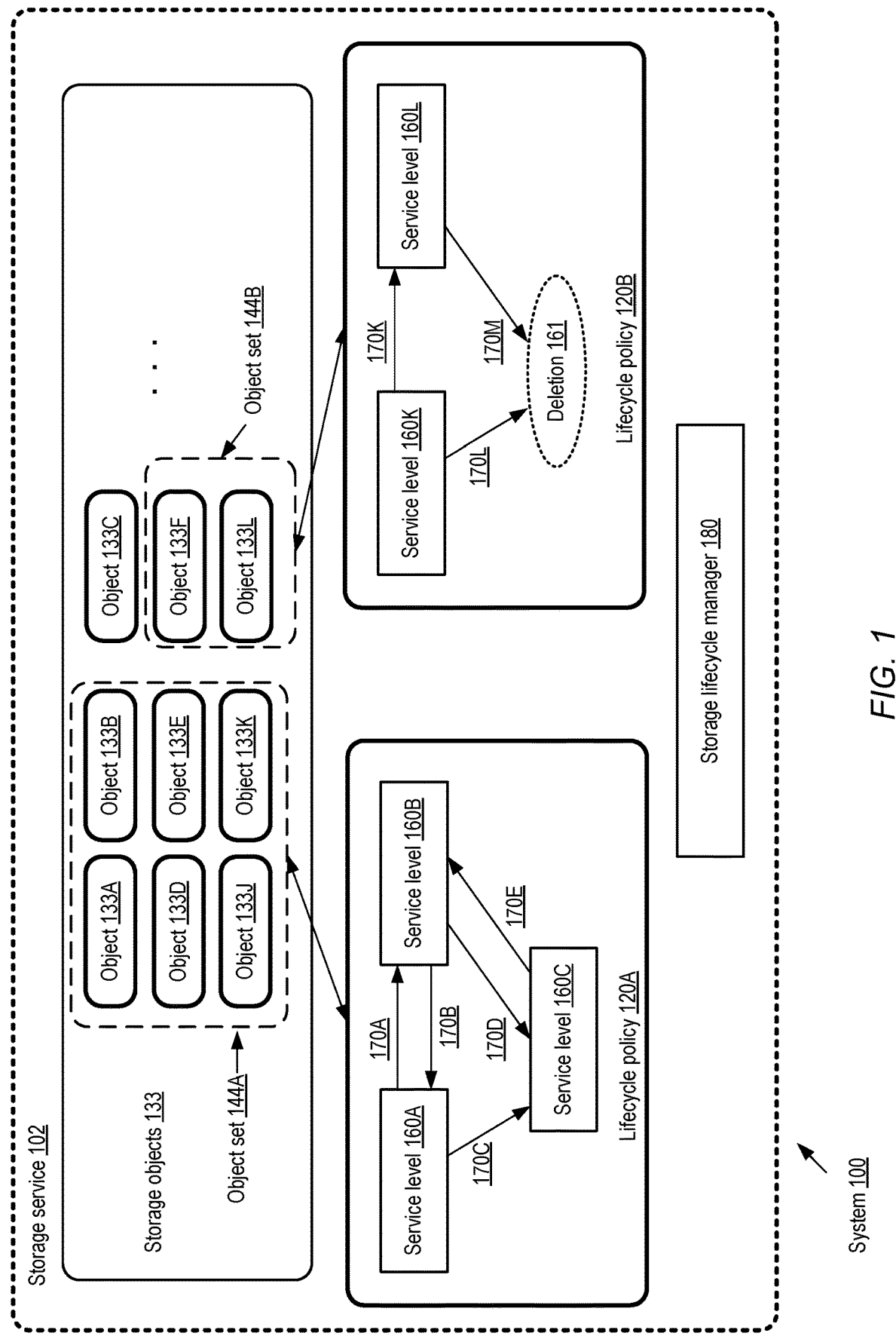
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for managing lifecycle transitions of client-generated storage objects stored within multi-tenant network-accessible storage services are described. In some embodiments, several different service levels may be supported for storage objects, where the service levels differ in various features and capabilities such as the supported data durability levels, availability levels, access performance, number of versions, number of replicas, and/or cost. Clients may be enabled to define lifecycle policies for specified sets of storage objects in some such embodiments, including the source and target service levels for each transition, and the criteria or rules to be used to decide whether and/or when the transitions should be implemented. Some of the transitions specified in a lifecycle policy may include object deletions, that is, rules or criteria may be specified for deciding when some storage objects are to be removed from the storage service. The billing costs for supporting the different service levels may vary based on the supported capabilities, so that client organizations may be able to limit, at least to some extent, the rate at which their data storage costs increase over time. Support for lower-cost service levels and scheduled deletions in lifecycle policies may also help in compliance with various regulations regarding data retention periods in at least some embodiments.

Networks set up by an entity such as a company or a public sector organization to provide one or more multi-tenant services (such as various types of cloud-based storage) accessible via the Internet and/or other networks to a distributed set of clients may be termed provider networks in this document. The term "multi-tenant" may be used herein to refer to a service that is designed to implement application and/or data virtualization in such a manner that different client entities are provided respective customizable, isolated views of the service, so that one client to whom portions of the service functionality are being provided using a given set of underlying resources may not be aware that the set of resources is also being used for other clients. A given provider network may include numerous data centers (which may be distributed across different geographical regions) hosting various resource pools, such as collections of physical and/or virtualized storage devices, computer servers, networking equipment and the like, needed to implement, configure and distribute the infrastructure and services offered by the provider.

According to one embodiment, a lifecycle manager component of a multi-tenant storage service implemented using computing devices of a provider network may be configured to receive (e.g., via one or more programmatic interfaces such as web pages or application programming interfaces (APIs)) an indication of a lifecycle policy to be implemented for a collection of one or more storage objects. The policy may indicate, for a given storage object, one or more lifecycle transitions from one service level to another, and one or more transition criteria corresponding to each lifecycle transition. A particular lifecycle transition may, for example, comprise a change from a first online service level in which disk-based storage devices are used to support a first data durability level of say 99.9999999%, to a different online service level in which disk-based storage is used to support a different data durability level of 99.99%, where the transition is accompanied by a reduction in billing rates. The term "online service level" may be used herein to indicate that disk-based storage devices, flash memory devices, or other devices that typically allow rapid random accesses are being used for the service level (as opposed to tape-based storage devices, for example, in which random accesses are typically much slower). Another lifecycle transition specified in the policy may comprise a move from one service level where a typical random input/output (I/O) access time is in the millisecond range, to a different, delayed-access service level with a lower billing rate. In some delayed-access service levels, a client's data may be stored on a storage device that is kept in a low-power-consumption mode by default (or for several hours a day), so that an I/O request may have to wait for minutes or even hours until the storage device is enters a full power mode. Disk-based storage may be used for the delayed-access service level, as well as for the service level supporting millisecond access times in at least some embodiments, although different types of disks and/or different physical arrangements of disks within storage devices, and/or of storage devices within data centers, may be used for the two service levels. In at least some embodiments, a given pair of service levels may not differ from each other in durability, availability, or performance, but may differ in other characteristics such as the software or hardware interfaces supported, or in pricing policies.

The storage lifecycle manager may further be configured to determine, based on the lifecycle policy, a data placement plan for at least a portion of the data of a given storage object in accordance with a particular requested lifecycle transition of the policy in some embodiments. The data placement plan may, for example, identify such parameters as the number of replicas of different sections or partitions of the storage object that are to be stored in the target storage level of the transition, the types of storage devices to be used, and/or the specific data centers, storage devices, or address ranges within storage devices that are to be used. The storage lifecycle manager may also be configured to determine the specific operations (such as copy operations, re-partitioning operations, coding operations in accordance with erasure coding policies being used for the target service level, and the like) to be performed for the transition. At least some of the operations to be scheduled may include modifications (e.g., write, append, create or delete operations) to data of the storage object and/or to metadata entries associated with of the storage object. In at least some embodiments, the lifecycle manager may be responsible for translating the high-level characteristics specified for a service level (such as a durability level D) into lower-level operations (e.g., store X logical replicas of the data of a given object, and distribute the X logical replicas across at least Y locations to meet the durability level D). The order in which various storage operations are to be initiated or performed, or a schedule according to which the various storage operations are to be performed, may be determined by the storage lifecycle manager in some embodiments.

Having determined the data placement plan and the operations, the storage lifecycle manager may eventually initiate the one or more modification operations in accordance with the plan in some embodiments. In at least one embodiment, the storage lifecycle manager may be configured to verify that the operations have succeeded. In response to a query, e.g., received via a programmatic interface from the client that owns a storage object for which a lifecycle transition was performed, or from another client that has the requisite authorization to view status of the storage object, the storage lifecycle manager may provide an indication of the current service level of the storage object.

In some embodiments, the service levels between which lifecycle transitions are implemented by the service may differ from each other along any combination of several dimensions. Service levels may differ, for example, in data durability (indicative of the probability of permanent loss of data), availability (indicative of how much time a given storage object is expected to be inaccessible over a given time period), performance (indicative of expected latencies, response times and/or throughputs for various types of storage operations), replication (how many physical or logical replicas of a given storage object are stored, e.g., in distinct physical locations), version support (how many versions of a given storage object can be retained), or the specific types of storage devices used for the service level (e.g., SATA disk versus SCSI disk versus flash memory, storage arrays supporting RAID-2 versus storage arrays supporting RAID-6, or storage from vendor X versus storage from vendor Y). Service levels may also differ in the pricing policies, e.g., the billing costs to the clients based on combinations of various factors such as the total amount of storage used for data and/or metadata, the number of accesses (reads and/or writes) of different types or sizes, the total incoming (to the service) and/or outgoing (to the client) bandwidth used for data transfers, and so on. Various types of transition criteria may be supported in some embodiments to determine when or if a transition is to be made—e.g., based on the age of a storage object (how long ago the object was created), the elapsed time since an object was last modified or read, the frequency of accesses to the object, or cost-related factors such as how much the retention of the object has so far cost its owner. Transitions in either direction between a given pair of service levels (e.g., from a fast-access-time level to a slow-access-time level, and from the slow-access-time level back to the fast-access-time level) may be specified in a given lifecycle policy in some embodiments, together with the respective rules of criteria for transitions in each direction. For example, a transition from service level S1 to S2 (with a higher access response time) may be made in one embodiment based on as assumption that after a year has passed since the object was created, it is unlikely to be accessed much; however, a transition back from S2 to S1 may be made in response to determining that the frequency of accesses to the object actually exceeds some specified threshold. As noted above, lifecycle transitions that result in scheduled deletions of storage objects by and from the storage service may be supported in some embodiments.

In at least some embodiments, a client may wish to determine if lifecycle policies can help meet client goals such as specific budget limits. In one such embodiment, the storage service may be configured to generate lifecycle transition recommendations, in response to a recommendation request that indicates a client goal and a set of candidate storage objects owned by the client to which the recommendations may be applied. The recommendations may be generated by the service based on usage metrics collected for the storage objects—e.g., the service may be able to identify objects that are rarely accessed and could therefore probably be moved to cheaper, lower-performance storage levels. The storage service may recommend specific one-time transitions, or policies that are to be applied more than once (e.g., whenever transition criteria specified in the policies are met) may be recommended in various embodiments. If the client accepts the recommendations, the corresponding transition operations may be scheduled, and/or the policies may be enforced going forward.

As described below in further detail, the storage lifecycle manager may itself be comprised of several subcomponents that are each responsible for a portion of the functionality—e.g., one subcomponent may be responsible for receiving and responding to client requests or queries, another may be responsible for identifying which set of objects are currently candidates for lifecycle transitions, another may be responsible for assigning resources for the storage metadata and data operations to implement the transitions, while yet another component may actually implement the storage operations. Some of the subcomponents may perform their operations asynchronously with respect to the others in at least some embodiments, e.g., using a pipelined approach in which tasks are queued or stored by one type of subcomponent and picked up for subsequent operations by a different type of subcomponent. In at least some embodiments different types of subcomponents may be incorporated at respective computing devices, while in other embodiments more than one type of subcomponent may be implemented using a single computing device.

In one such embodiment, a transition job generator subcomponent may be configured to perform, at various points in time, candidate discovery iterations to identify objects ready for lifecycle transitions. During a given candidate discovery iteration, the job generator may group candidate objects into batches, and store the batches within special transition job objects in the storage service itself. The job objects may named, or stored in logical containers of the service that are named, in accordance with characteristics of the transitions—e.g., based on the source and target service level, the relative priority of the transitions, the time at which the candidates were identified for the transitions, etc. After completing a candidate discovery iteration, the transition job generator may be configured to enter a dormant or sleep state until the next iteration is to begin in such embodiments.

Another subcomponent of the storage lifecycle manager, which may be termed a transition task dispatcher herein, may be responsible for assigning resources to the transitions identified in the job objects in some embodiments. The transition task dispatcher may also be configured to perform its operations in execution iterations separated by periods of dormancy or sleep, with the dispatcher's execution iterations being started independently of, and/or asynchronously with respect to, the transition job generator's candidate discovery iterations. The transition task dispatcher may assign resources such as worker threads from a pool of available threads, or time slots during which storage operations (e.g., storage object metadata and/or data reads, copies, moves, writes, creates, or deletes) can be scheduled, to the transitions identified in the jobs. Using the assigned resources, the storage operations needed to implement the transitions specified in the transition job objects may be initiated. In some embodiments, the storage operations may also be performed asynchronously with respect to the assignment of resources and the identification of the transition candidates, e.g., the task dispatcher may store task objects indicating the required operations in a queue or a list, and worker thread subcomponents of the storage lifecycle manager may be configured to take tasks off the queue or list and perform the corresponding operations.

A number of different factors may be taken into consideration to decide when the next transition candidate discovery iteration is to be started, or when the next execution iteration is to be started, in various embodiments. For example, in some embodiments a fixed schedule or time windows may be used to schedule the iterations, or factors such as the current utilizations of various computing devices and/or network links in use for the lifecycle manager or other components of the storage service may help determine the schedule. In at least some embodiments, some of the iterations may be "piggy-backed" or performed as part of already-scheduled operations such as billing cycles during which a billing module of the storage service is configured to examine the storage objects in various client-owned logical containers for billing purposes. In some embodiments, when an internal representation of a lifecycle policy is created by the storage lifecycle manager, notification mechanisms may be activated for the policy, which may eventually trigger the iterations of the transition job generator and/or task dispatcher. For example, the provider network in which the storage service is implemented may also provide a notification service usable by external clients or by the storage service in some embodiments, and such a notification service may be used to schedule the iterations of the job generator and/or the task dispatcher. In some embodiments, a review of the status of a candidate discovery iteration may trigger the scheduling of a task execution iteration, a review of the status of a task execution iteration may trigger the scheduling of a candidate discovery iteration, or a review of the status of a worker thread pool may trigger the scheduling of candidate discovery iteration or a task execution iteration. Task execution iterations may be initiated dependent on the number of outstanding transition job objects stored in the service in some embodiments. After all the transitions indicated in a job object are initiated or completed, in some embodiments the job object itself may be scheduled for deletion from the storage service.

According to one embodiment, the storage may store redundant copies or replicas of storage objects (including redundant copies of data portions and/or metadata entries), e.g., to support default levels of durability for the storage objects, regardless of whether specific lifecycle policies are applied to the objects or not. Respective replicas of a given storage object may be stored in geographically separated locations in some embodiments—e.g., replica R1 of object O1 may be stored in a data center DC1, replica R2 in a different data center DC2, and so on. For performance and/or other reasons, the replicas of a given storage object may not be completely identical at a given point in time in some embodiments—e.g., an update may be applied to one replica R1 some time before the update is applied to replica R2. A reconciliation protocol may be used for eventual replica synchronization in at least some embodiments, as described below in further detail. Various types of reconciliation protocols may be used in different embodiments, including for example protocols that rely on modification sequence numbers (MSNs) to resolve conflicts, where if two conflicting update operations for the same object identifier or key are detected at different replicas, the operation with the more recent (higher) MSN is determined to be the "winner"—i.e., the operation with the higher MSN is accepted as the valid operation to resolve the conflict.

In at least one embodiment, modification sequence numbers may be used to prevent unintended or no-longer-valid lifecycle transitions under certain conditions, such as when an update to a lifecycle policy takes some time to propagate through the service. Computing devices of a system implementing a multi-tenant storage service in such an embodiment may be configured to receive a lifecycle policy of the kind described above, to be applied to at least a set of storage objects stored within a particular logical container of the storage service. The devices may store a representation of the lifecycle policy, e.g., within a data component of an additional storage object created in the storage service, and a policy modification sequence number (PMSN) indicative of a most recent modification of the lifecycle policy in a metadata entry for the additional storage object. An indication that the lifecycle policy applies to objects of the particular storage container may also be stored in the storage service, e.g., in a metadata entry for the particular logical container. Such an indication of policy applicability may be associated with a policy application sequence number (PASN) derived at least in part from the PMSN—for example, in one implementation, the PASN in the logical container metadata may initially be set equal to the PMSN corresponding to the time of creation of the lifecycle policy.

A storage service component may determine whether a modification operation (such as a copy, move or delete operation) is to be performed to implement a lifecycle transition for a particular storage object of the set of storage objects in accordance with the lifecycle policy, based at least in part on a comparison of the PASN and the PMSN in some embodiments. If the service component determines that the modification is to be performed, an execution of the modification may be scheduled. If the comparison of the sequence numbers indicates that the transition may be invalid, e.g., if an inconsistency is detected between the sequence numbers in the metadata entries, the modification operation may be canceled or postponed until the inconsistency is resolved, e.g., via reconciliation or as a result of client intervention. For example, in one embodiment, clients may be enabled to modify (a) the lifecycle polices and/or (b) the applicability of lifecycle policies to contents of logical containers. In such an embodiment, when a client changes a policy P1 that was previously applied to a logical container LC1, the PMSN of P1 may be updated, and the service may also to update the PASN in LC1's metadata to match or equal the new PMSN, so that under normal operating conditions, the PMSN may be expected to have the same value as the PASN. If, before scheduling a modification for a transition indicated in the policy, the service determines that P1's PMSN is less than the PASN, this may suggest that there is a newer version of the lifecycle policy than the one being currently considered for implementation (e.g., because an update to some replica of P1 has not propagated to the current replica being used by the service). Making a modification on the basis of a policy that is potentially out-of-date may thus be prevented by checking the values of the PMSN and PASN. In some embodiments, if the PASN is less than the PMSN, the service may also determine not to schedule modifications until the discrepancy is corrected, e.g., during reconciliation. For example, in at least some embodiments, P1's PMSN may be updated when the policy is deleted (with the deletion being reflected in the logical container's metadata only later, e.g., by removing the PASN and any other references to P1), and implementing a transition when the PASN is lower than the PMSN may thus also risk applying a no-longer-applicable policy.

In at least some embodiments, a storage service offered by a provider network may include a differential priority model for at least some of the operations associated with lifecycle transitions, relative to I/O operations requested directly by clients (such as reads or writes, to which clients typically want responses as soon as possible). Accordingly, in such embodiments, the service components and methodologies used for lifecycle transitions may be designed with a goal of minimizing the impact of the transitions (which may be considered "background" activity) on the responsiveness of "foreground" client requests. At the same time, the operator of the provider network may wish to ensure that desired service level transitions are completed without too much delay. The asynchronous and pipelined architecture described above may be helpful in balancing these needs, e.g., by limiting the duration of candidate discovery iterations or task execution iterations when the foreground client I/O workload is high.

Example System Environment

FIG. 1 illustrates an example system environment, according to at least some embodiments. As shown, system 100 may include a plurality of client-owned storage objects 133 (such as objects 133A, 133B, 133C, 133D, 133E, 133F, 133J, 133K and 133L) and a storage lifecycle manager 180 of a distributed, network-accessible multi-tenant storage service 102. Generally speaking, a storage object 133 may comprise any set of data or "bits" generated by an authorized client of the storage service, and identified by a client-specified or service-generated object identifier or key in the depicted embodiment. Storage objects 133 may also have associated metadata entries, as described below in greater detail, such as keymap entries that indicate the location(s) of data corresponding to a particular identifier or key. Storage objects 133 (or fragments thereof) may be distributed across various types of storage devices, located in various data centers spread across different geographical regions or countries in some embodiments. Some collections of storage objects 133 may have lifecycle policies 120 associated with, or applied to, them—for example, lifecycle policy 120A may apply object set 144A comprising objects 133A, 133B, 133D, 133E, 133J and 133K, while lifecycle policy 120B may apply to objects 133F and 133L of object set 144B in the depicted example. Some storage objects such as 133C may not have any lifecycle policies applied, at least at a given point in time; thus, lifecycle policies may be optional and not mandatory for the storage objects 133 in some embodiments. In other embodiments the storage service may define a default lifecycle policy for all storage objects 133, and may enable authorized clients to modify or disable the default lifecycle policies.

Lifecycle policies 120 may be created and/or applied to sets 144 of storage objects 133, or to individual storage objects 133, in response to client requests in some embodiments. A client may specify, for inclusion in a given policy 120, one or more lifecycle transitions 170 between pairs of service levels 160, or between a service level 160 and deletion 161 of the storage objects to which the policy is applied. Service levels 160 may differ from each other in various characteristics, such as the supported data durability of storage objects (the likelihood of data loss), availability (downtime targets), performance (e.g., latency, response times or throughputs of various kinds and sizes of data operations), replication level (e.g., the number of distinct logical or physical replicas of data and/or metadata entries that are maintained for storage objects), geographical distribution (e.g., how the data and/or metadata for storage object is distributed geographically across multiple data centers, regions or countries), version count (e.g., limits on the numbers of distinct versions of the storage objects that can be maintained), operation error rates (e.g., targeted maximum error rates for reads or writes), storage device type (e.g., the hardware or software standards or technologies being used for storage, the storage capacity of individual devices, and/or the vendors whose devices are being used), and/or costs to the clients. In some embodiments the storage service 102 may define a set of supported service levels 160, and clients may be enabled to specify transitions among pairs of the supported service levels. In other embodiments, clients may also or instead be enabled to define service levels, e.g., by specifying desired service characteristics of the types listed above; the storage service 102 may decide whether or not it can support the specified service characteristics, and if the characteristics can be supported, the storage service may determine the billing rates that the client may be charged for storage objects placed in that client-defined service level.

Each transition 170 may be specified by indicating the source service level, the target service level (or deletion), and the rules or criteria to be used to determine if and when storage objects are to be transferred from the source to the target service level (or deleted). (For simplicity of explanation, deletion from the storage service 102 may be considered a special case of a service level herein, so that the term "transition" may be used to indicate not only a change from one service level to another service level, but also a removal of a storage object from the storage service.) For example, transition 170A in FIG. 1 has source service level 160A and target service level 160B, while transition 170B has source service level 160B and target service level 160C. As shown in the example lifecycle policy 120A, transitions 170 may be defined in either direction (or both directions) between a given pair of service levels (such as transition 170A and 170B). Some service levels may have no transitions leading into them (e.g., service level 160K of policy 120B), and some service levels may not have transitions leading out of them. In at least some embodiments, objects 133 that are deleted may not be re-instantiated (e.g., the deletions element 161 of policy 120B does not have any outgoing transition). A number of different types of transition criteria may be specified in various embodiments, such as criteria based on elapsed time since certain events (e.g., a storage object 133 may be moved from one service level 160 to another based on time elapsed since the object was created, time elapsed since it was last read, or time elapsed since it was last written), the frequency of access or modifications of a storage object 133, the accumulated or anticipated cost to the client of retaining a storage object 133 in its current service level, and so on.

The storage lifecycle manager 180, which may also be referred to herein simply as the lifecycle manager, may be configured to perform several different types of operations to support the lifecycle transitions specified in policies 120 in the depicted embodiment. For example, the lifecycle manager 180 may implement programmatic interfaces (such as APIs or web pages) in one embodiment to receive lifecycle policies or service level definitions from clients, validate the policies/definitions, store the policies/definitions as objects within the service 102, and respond to client requests to view, modify, apply or delete lifecycle policies, or to view the current service level of a given storage object. Lifecycle manager 180 may also be configured in some embodiments to identify storage objects for which operations are to be scheduled to implement applicable lifecycle transitions 170 (i.e., to determine whether transition criteria specified for the transitions have been met), to assign resources to implement the operations, to implement the operations using the assigned resources, and to verify that the operations have succeeded. The kinds of operations implemented may vary depending on the source and target service levels, as described below in further detail. As also described below in considerable detail, the lifecycle manager may comprise several different types of subcomponents respectively responsible for various portions of the lifecycle manager's functionality in some embodiments, and in some implementations several of these subcomponents may perform their activities asynchronously with respect to each other. Lifecycle manager 180 components may be distributed or replicated in some embodiments, e.g., at different computing devices within a data center or across multiple data centers. In other embodiments, a single computing device may host several or all the subcomponents of the lifecycle manager 180.

A given lifecycle policy 120 may be applied to multiple sets of storage objects 133 in some embodiments, e.g., to objects owned by different clients. For example, in one embodiment the storage service 102 may allow any client to inspect a collection of pre-defined lifecycle policies, modify or adapt a selected lifecycle policy if desired, and apply the policy to a target set of storage objects 144. In some embodiments, clients may share policies that they have defined with other clients, or offer policies to other clients in return for monetary compensation. In at least one embodiment, the storage service 102 may charge clients for implementing a lifecycle policy (i.e., the client may be billed not just for the storage used for the client's objects, but also for changing the service levels being provided for the objects).

Constituent Elements of Lifecycle Policies

Figure 2:
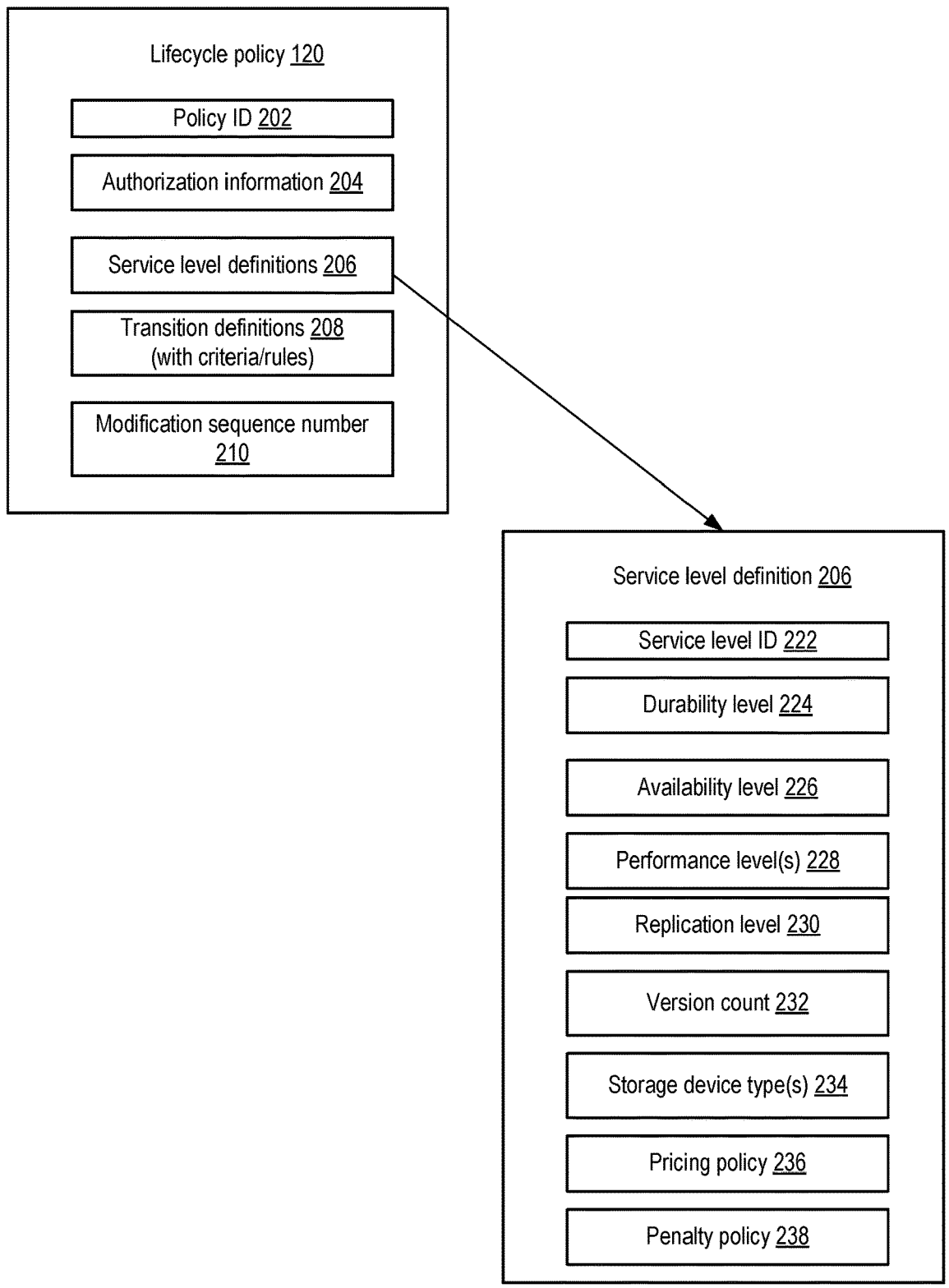
FIG. 2 illustrates examples of constituent elements of lifecycle policies and service level definitions, according to at least some embodiments.

FIG. 2 illustrates examples of constituent elements of lifecycle policies 120 and service level definitions, according to at least some embodiments. As shown, a lifecycle policy 120 may comprise a policy identifier 202 as well as authorization information 204 that may indicate, for example, which clients or users are allowed to view, modify or apply the policy. The policy 120 may include one or more service level definitions 206 (or pointers to existing service level definitions), and a set of transition definitions 208. A modification sequence number 210 or timestamp indicating when the policy was created or most recently modified may be stored for a lifecycle policy in at least some embodiments. A transition definition 208 may indicate, for a given transition, the origin or source service level, the destination or target service level, and the rules or criteria to be applied to decide when the transition should be implemented. It is noted that at least in some implementations, it may be possible to specify one-time-only transitions, indicating for example that a particular transition is to be implemented just once when the corresponding criteria are met, instead of, for example, the storage service having to repeatedly check whether the criteria are met and implementing the transition accordingly. In at least some embodiments, some or all of the elements of a lifecycle policy shown in FIG. 2 may be stored in the storage service 102, e.g., in logical containers dedicated for lifecycle policies.

A service level definition 206, which may be defined within a lifecycle policy 120, or pointed to from a lifecycle policy (e.g., using the service level identifier 222 as a pointer or reference) may comprise any of a variety of elements in different embodiments. For example, in addition to a service level identifier 222, the service level definition may indicate a data durability level 224 for storage objects, an availability level 226, and/or one or more performance levels 228 in the depicted embodiment. Durability and/or availability may be specified using percentages in some embodiments, such as "99.99999999% durability" or "99.999% uptime". Any of a number of different types of performance levels may be specified, such as expected values of latencies, response times, and/or throughputs for various types of storage operations such as create, read, update and (foreground, or client-requested, immediate) delete operations. In one embodiment, performance characteristics or targets may also be specified for transitions between service levels—e.g., a given service level definition S1 may include an indication of how long a transition of a storage object to that service level from a different service level S2 is to take. In some embodiments a service level definition may indicate replication levels 230 for storage objects, i.e., how many logical or physical replicas of each storage object are stored. At least some of the service level characteristics illustrated in FIG. 2 may be correlated—e.g., the replication count of storage objects may impact durability or availability, so in some implementations replication may not be specified explicitly in the service level definition if durability or availability is specified. In some such embodiments, durability levels may correspond to respective replication counts, e.g., to support a durability level D1 for a given storage object, M logical or physical replicas of the object may be maintained, while to support a different durability level D2, N logical or physical replicas may be maintained.

In some embodiments, a version count 232 may be included in a service level definition, indicating how many distinct versions of a given storage object are retained while the object remains in that service level. In some embodiments, transitions between service levels may involve movement of object versions—e.g., in one embodiment on which two service levels S1 and S2 are defined, a client may keep up to N versions of a storage object in service level S2, but if another version of the object is created, at least one of the N+1 versions (such as the oldest version) may be moved to service level S2. In some embodiments the service level definition 206 may include an indication of the types 234 of storage devices used for the storage objects—e.g., the types of disk(s) or memory used, the hardware and/or software storage protocols or standards used, or the vendors used.

In at least some embodiments, each service level may have an associated pricing policy 236, indicating for example how much a client may be charged (a) for storing an object comprising X bytes for a time period T at the service level specified, (b) per read or write operation, and/or (c) as a function of storage-related bandwidth usage. In at least some embodiments, a service level definition 206 may also include penalty policies 238. A penalty policy may indicate, for example, what kinds of rebates or reductions in billing a client may receive if the service level fails to meet one or more of the specified service level characteristics such as durability, availability or performance. In one embodiment, penalties may also or instead indicate the discount or reduction in billing a client may be entitled to if storage objects are not moved out of the service level within a certain deadline after transition criteria are met. (In some implementations, such penalties associated with transition delays may be indicated as properties of the transitions rather than the service levels per se.) It is noted that at least in some embodiments, not all of the elements shown for lifecycle policies 120 or service level definitions 206 in FIG. 2 may be included, and that other elements not shown in FIG. 2 may be included in some embodiments. In one embodiment, service level definitions 206 may be stored in the storage service as first-class objects, and may be referred to from the lifecycle polices using their object identifiers or keys.

Overview of Storage Service User Interface and Storage Model

Figure 3:
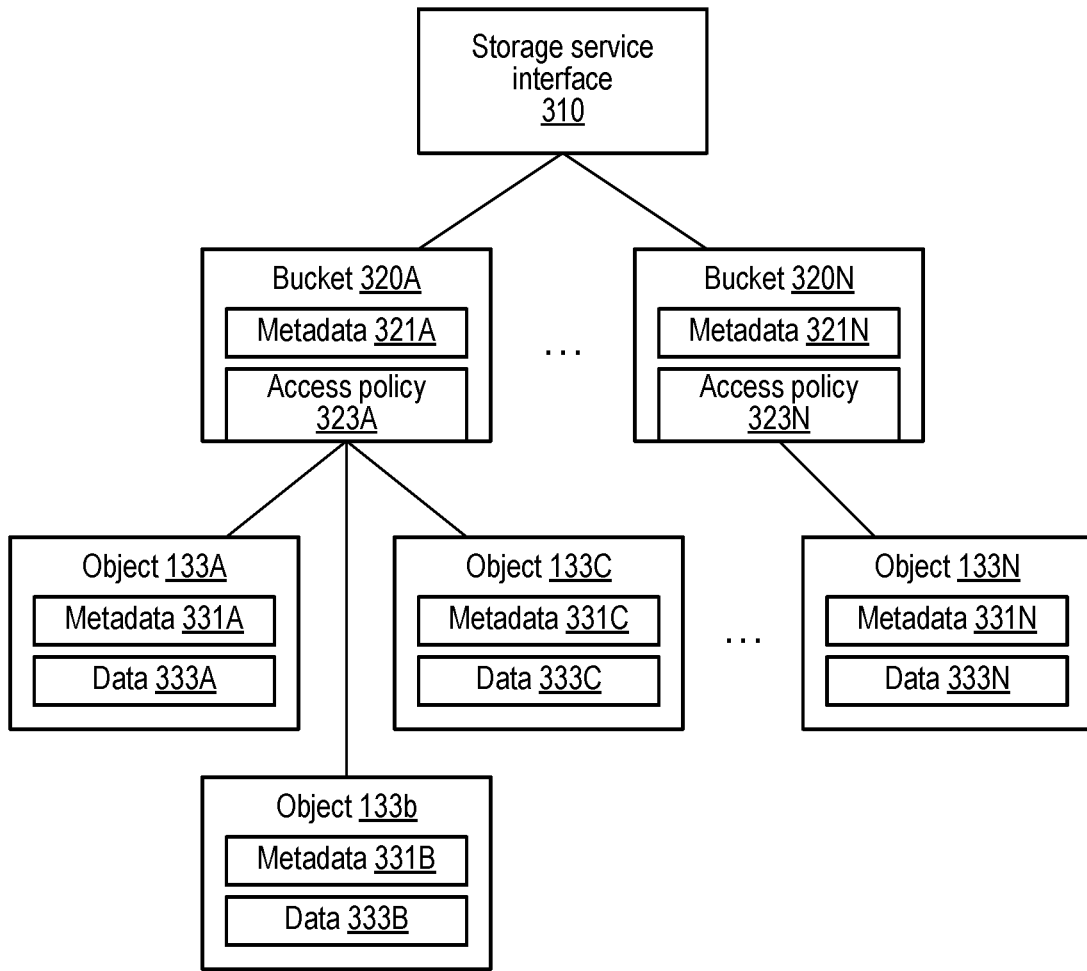
FIG. 3 illustrates an example of a storage model that may be supported by a storage service, according to at least some embodiments.

FIG. 3 illustrates an example of a storage model that may be supported by a storage service 102, according to at least some embodiments. In the illustrated model, storage service interface 310 is provided as a client- or user-facing interface to the storage service 102. According to the model presented to a user by programmatic interface 310, the storage service may be organized as an arbitrary number of logical containers called buckets 320A-320N accessible via interface 310. Each bucket 320 may be configured to store an arbitrary number of objects 133A-N, which in turn may store data specified by a user of the storage service. In at least some embodiments, buckets may be further subdivided into a hierarchy of lower-level containers such as "partitions".

In some embodiments storage service interface 310 may be configured to support interaction between the storage service 102 and its users according to a web services model. For example, in one embodiment, interface 310 may be accessible by clients as a web services endpoint having a Uniform Resource Locator (URL), e.g., "http://<StorageServiceName>.<DomainName>.com", to which web services calls generated by service clients may be directed for processing. Generally speaking, a web service may refer to any type of computing service that is made available to a requesting client via a request interface that includes one or more Internet-based application layer data transport protocols, such as a version of the Hypertext Transport Protocol (HTTP) or another suitable protocol. Web services may be implemented in a variety of architectural styles in different embodiments, using a variety of enabling service protocols. For example, in a Representational State Transfer (REST)-style web services architecture, the parameters that are pertinent to a web services call (e.g., specifying the type of service requested, user credentials, user data to be operated on, etc.) may be specified as parameters to the data transport command that invokes the web services call to the web services endpoint, such as an HTTP GET or PUT command. In contrast to REST-style web services architectures, in some embodiments document-based or message-based web services architectures may be used. In such embodiments, the parameters and data pertinent to a web services call may be encoded as a document that may be transmitted to a web services endpoint and then decoded and acted upon by the endpoint. For example, a version of eXtensible Markup Language (XML) or another suitable markup language may be used to format the web services request document. In some embodiments, interface 310 may support interfaces other than web services interfaces, instead of or in addition to a web services interface. For example, a provider network may implement a storage service 102 for use by clients external to the enterprise, who may access the service via web services protocols, as well as users or components within the provider network, who may use a different type of interface (e.g., a proprietary interface customized for an intranet). In some such embodiments, the portion of interface 310 relating to client interaction (e.g., via web services protocols) may be bypassed by certain users or service components, such as components of lifecycle manager 180, that are internal to the storage service. In the following description, the terms "put" and "get" (corresponding to the HTTP PUT and GET operations that may be supported in some embodiments by interface 310) may be used more generally to represent modification operations and read operations, respectively, that may be performed or requested on various data and/or metadata entries for storage objects. Thus, modification operations (such as creates, writes, updates, or deletes) may collectively be referred to as "put" operations, while reads may be referred to as "get" operations, even though in at least some embodiments, interfaces or APIs other than the PUT and GET HTTP commands may be used for the actual operations performed.

As shown in FIG. 3, interface 310 provides storage service users with access to buckets 320. Generally speaking, a bucket 320 may function as the root of an object namespace that is associated with a user of the storage service. For example, a bucket 320 may be analogous to a file system directory or folder. In some embodiments, individual buckets 320 may also form the basis for accounting for usage of the storage service. For example, a particular client user may be associated with one or more buckets 320 for billing purposes, and that user may be billed for usage of storage resources (e.g., storage of objects 133) that hierarchically reside within the namespace established by those buckets 320.

In the illustrated embodiment, each of buckets 320A-N includes associated metadata 321A-N as well as a respective access policy 323A-N. Generally speaking, metadata 321 may include any suitable metadata that may be used to describe aspects or properties of a given bucket 320; examples of bucket metadata elements are shown in FIG. 4A and described below. An access policy 323 of a bucket 320 may include any information (such as credentials, roles or capabilities) needed to control access to objects 133 associated with the bucket. As shown, a given bucket 320 may be associated with one or more objects 133, each of which may include respective metadata 331 and data 333. Generally speaking, data 333 of an object 133 may correspond to any sequence of bits. The type of data represented by the bits stored within an object 133 may be transparent to the storage service 102. That is, the bits may represent text data, executable program code, audio, video or image data, or any other type of digital data, and the storage service may not necessarily distinguish among these various data types in storing and manipulating objects 133. Similar to metadata 321 associated with buckets 320, object metadata 331 may be configured to store any desired descriptive information about its corresponding object 133. Example elements of object metadata are illustrated in FIG. 4B and described below.

FIG. 4A illustrates examples of constituent elements of metadata for logical containers such as buckets 320 implemented in a storage service 102, according to at least some embodiments. Although the container metadata shown in FIG. 4A applies to buckets 320, similar metadata may be maintained for other logical containers in some embodiments, such as for bucket partitions or other lower-level logical containers into which each bucket may be divided. As shown, bucket metadata 321 may include a bucket key 402 that uniquely identifies the bucket, and an identification 406 of the owner (e.g., the client that is billed for storage of objects 133 included in the bucket). For buckets that are used to store objects created by components of the storage service (such as buckets used for storing lifecycle policies or transition job objects), a special owner ID 406 may be used to indicate that the bucket comprises service-created objects used for administrative or management purposes in some embodiments. The bucket key 402 may be generated either by the owner, or by the storage service 102. In the depicted embodiment, bucket metadata 321 may also include a bucket modification sequence number 410, which may indicate the time at which the bucket was created or last modified. Sequence numbers may be used in resolving update conflicts in some embodiments, e.g., when conflicting concurrent updates to metadata are attempted, as described below in further detail. A number of different bucket statistics 414 may be included in the bucket metadata in some embodiments, such as the number of objects 133 associated with the bucket, the total size of the objects, access history information on the objects, usage characteristics for the bucket, billing history for the bucket, and so on. It is noted that in some embodiments, a given bucket 320 may not include explicit references, pointers or other information corresponding to the objects 133 associated with given bucket 320. Rather, as described in greater detail below, location and selection of objects 133 may be performed through the use of a separate metadata facility referred to as a keymap.

In at least some embodiments, one or more lifecycle policy identifiers 418 indicating the lifecycle policies that apply to at least some objects of the buckets may be included in bucket metadata 321. In some embodiments, lifecycle policies indicated for a bucket may be applied to objects that are created in the bucket in the future, i.e., not all the objects to which a lifecycle policy is to apply need to exist at the time that the policy is specified. In addition, for each applicable lifecycle policy, a policy assignment sequence number (PASN) 422 may be included in the bucket (e.g., indicative of when the policy or policies were applied to the bucket), which may be based at least in part on the modification sequence number of the corresponding policy, and may be used to ensure that invalid policy transitions do not get implemented, as described in further detail below. It is noted that at least in some embodiments, a plurality of lifecycle policies may be applied to the objects 133 of a given bucket—e.g., one policy P1 may be applied to one set S1 of objects of the bucket, while another policy P2 may be applied to another set S2 of the bucket's objects. S1 and S2 may be indicated by specifying respective prefixes within the object namespace associated with the bucket in one embodiment, e.g., if a bucket's namespace as a whole is represented using the prefix "/bucketname1" in an implementation in directory notation is used for namespaces, S1 may be specified using the prefix "/bucketname1/a", and S2 may be specified using the prefix "/bucketname1/b". In some implementations, multiple policies may be applied to the same object 133; for example, one policy may indicate transitions between service levels that differ in durability, while another policy may indicate when the object is to be scheduled for deletion based on the object's age, regardless of which service level it happens to be in. In some embodiments, lifecycle manager 180 may be responsible for verifying that, if multiple lifecycle policies are to be applied to a given storage object or set of storage objects, the policies do not indicate conflicting transition criteria (e.g., when the same criterion C is defined to move an object from service level SL1 to SL2 in one policy P1, and from SL1 to SL3 in another policy P2). If conflicting criteria are found, the conflict may be resolved by the lifecycle manager in some embodiments by ignoring one of the conflicting policies and/or informing the client on whose behalf the policies were to be applied. The combination of the policy identifier(s) 418 and the PASN(s) 422 in bucket metadata 321 may collectively be considered indicators of the fact that one or more lifecycle policies apply to the bucket; e.g., to determine whether any lifecycle policies apply to a given bucket in some embodiments, the bucket's metadata may be checked to see whether policy identifiers and corresponding PASNs are indicated therein.

Figure 4B:
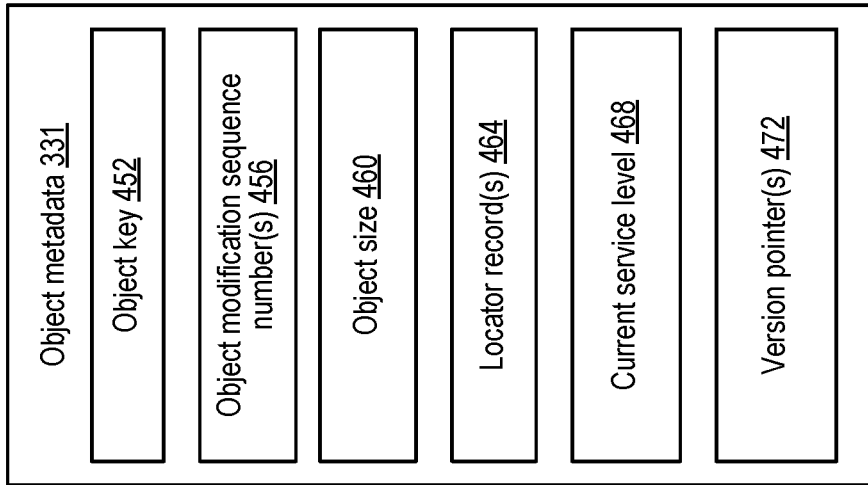
FIG. 4B illustrates examples of constituent elements of metadata for storage objects managed in a storage service, according to at least some embodiments.
Figure 4A:
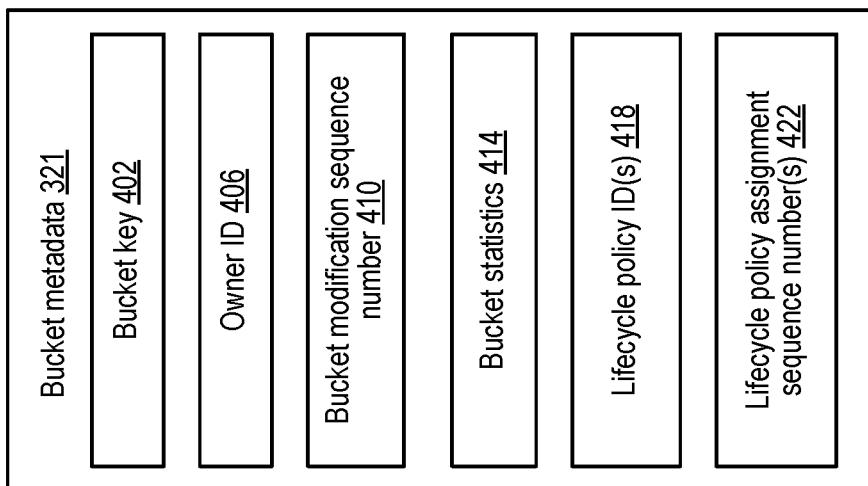
FIG. 4A illustrates examples of constituent elements of metadata for logical containers implemented in a storage service, according to at least some embodiments.

FIG. 4B illustrates examples of constituent elements of metadata for storage objects 133 managed in a storage service 102, according to at least some embodiments. As shown, the object metadata 331 may include an object key 452, an object modification sequence number 456 indicating when the object was last modified (or created), and element 460 indicating the object's size. In the depicted embodiment, individual objects 133 may be identified within the storage service using either of two distinct items of information: the object key 452, or a locator which may be stored in element 464 of the illustrated object metadata 331. Generally speaking, keys and locators may each include alphanumeric strings or other types of symbols that may be interpreted within the context of the namespace of the storage service as a whole, although keys and locators may be interpreted in different ways. In one embodiment, a key may be specified by a client at the time a corresponding object 133 is created within a particular bucket 320 (e.g., in response to a request by the client to store a new object). If no key is specified by the user, a key may be assigned to the new object 133 by the storage service. In such an embodiment, each respective key associated with objects 133 of a particular bucket 320 may be required to be unique within the namespace of that bucket 320. Generally speaking, a key may persist as a valid identifier through which a client may access a corresponding object 133 as long as the corresponding object exists within the storage service.

In some embodiments, a request by a client to access an object 133 identified by a key may be subjected to client authentication procedures, access control checks, and/or a mapping process (such as described in greater detail below) before the underlying data 333 of the requested object 133 is retrieved or modified. In contrast, the storage service may support an alternative method of accessing objects 133 by locators rather than keys. Generally speaking, a locator may represent a globally unique identifier of an object 133 among all objects 133 known to the storage service 102. That is, while a key may be unique to a namespace associated with a particular bucket 320, a locator may be unique within a global namespace of all objects 133 within all buckets 320. For example, a locator may include an alphanumeric string generated by the storage service to be unique among other locators. As described in greater detail below, in some embodiments, multiple instances of an object 133 may be replicated at respective physical storage devices used to implement the storage service, for example to increase data redundancy and fault tolerance. In such embodiments, a unique locator may exist for each replicated instance of a given object 133, and a respective record 464 of each of the locators may be maintained as part of the object metadata. Object metadata 331, which comprises an object key 432 and a mapping to the physical locations (e.g., locator records 464) at which the object's data is stored may also be referred to herein as a "keymap" metadata entry, or simply as a "keymap" entry.

In the embodiment depicted in FIG. 4B, object metadata 331 may also include an element 468 indicating the current service level of the object. In other embodiments, such service level indicators may not be stored explicitly, and the current service level may be deduced based on other metadata for the object (such as locator records 464), or based on metadata of the logical container of the object. Version pointer(s) 472 may be included in object metadata 331 in some embodiments in which multiple versions of storage objects are supported. In implementations where each version of a storage object 133 is treated as a full-fledged storage object with its own identifier and/or locators, for example, the version pointers may comprise the object identifiers and version numbers of the other versions of the object. It is noted that in different embodiments, not all the elements of bucket metadata 321 shown in FIG. 4A or object metadata 331 shown in FIG. 4B may be implemented, and other elements not shown in FIG. 4A or 4B may be included in the metadata entries in some embodiments.

In at least some embodiments, some sequence numbers associated with container metadata and/or object metadata, such as object modification sequence number 456 or bucket modification sequence number 410, may be used to resolve update conflicts. For example, in response to various client- or system-driven operations, two different attempts may be made to concurrently change the contents of a given object's metadata 331 (e.g., to add, delete or modify locators), or an attempt to modify the metadata 331 may be made at about the same time as another attempt to delete the metadata 331 is made. In order to provide a consistent method for resolving concurrent requests to a given metadata entry, in one embodiment the service may require that at least some operations that update or modify metadata have an associated sequence number. In some embodiments a sequence number generator component of the storage service 102 may automatically generate a sequence number for each modification operation. The sequence number generator may be implemented, for example, as a service accessible to various external clients of the service and/or internal components of the service such as lifecycle manager 180. A web service request addressed to a particular URL supported by the storage service 102 may be used to obtain a sequence number in some embodiments. The sequence number may for example be based on a timestamp (based on either a local clock at one of the clients or at a computing device implementing a service component, or on a global clock maintained by the service) in some implementations. For example, a 64-bit number or a 128-bit number may be used as a sequence number in some implementations, with some bits of each sequence number being set to the number of seconds or milliseconds since a reference point in time (e.g., Jan. 1, 1970 at midnight, Greenwich Mean Time, a reference time employed by many versions of Unix and Linux), and other bits being generated at random. Similar time-based sequence number generation techniques may be used for the lifecycle policy assignment sequence numbers 422, whose use in preventing unintended or obsolete lifecycle transitions is described in further detail below. Conflicting updates to a metadata entry may be resolved in some embodiments by comparing the sequence numbers of the conflicting operations (e.g., numerically or lexicographically) and consistently picking one of the operations on the basis of the comparison (e.g., the operation with the highest sequence number among a conflicting set of update operations may supersede operations with lower sequence numbers). Provided the resolution of the sequence number is high, the chance of collision among different sequence numbers for operations on the same metadata entry may be low. However, if a collision were to occur, the service may resolve the collision using any suitable, consistent technique.

Data Mappings to Support Lifecycle Transitions

Figure 5:
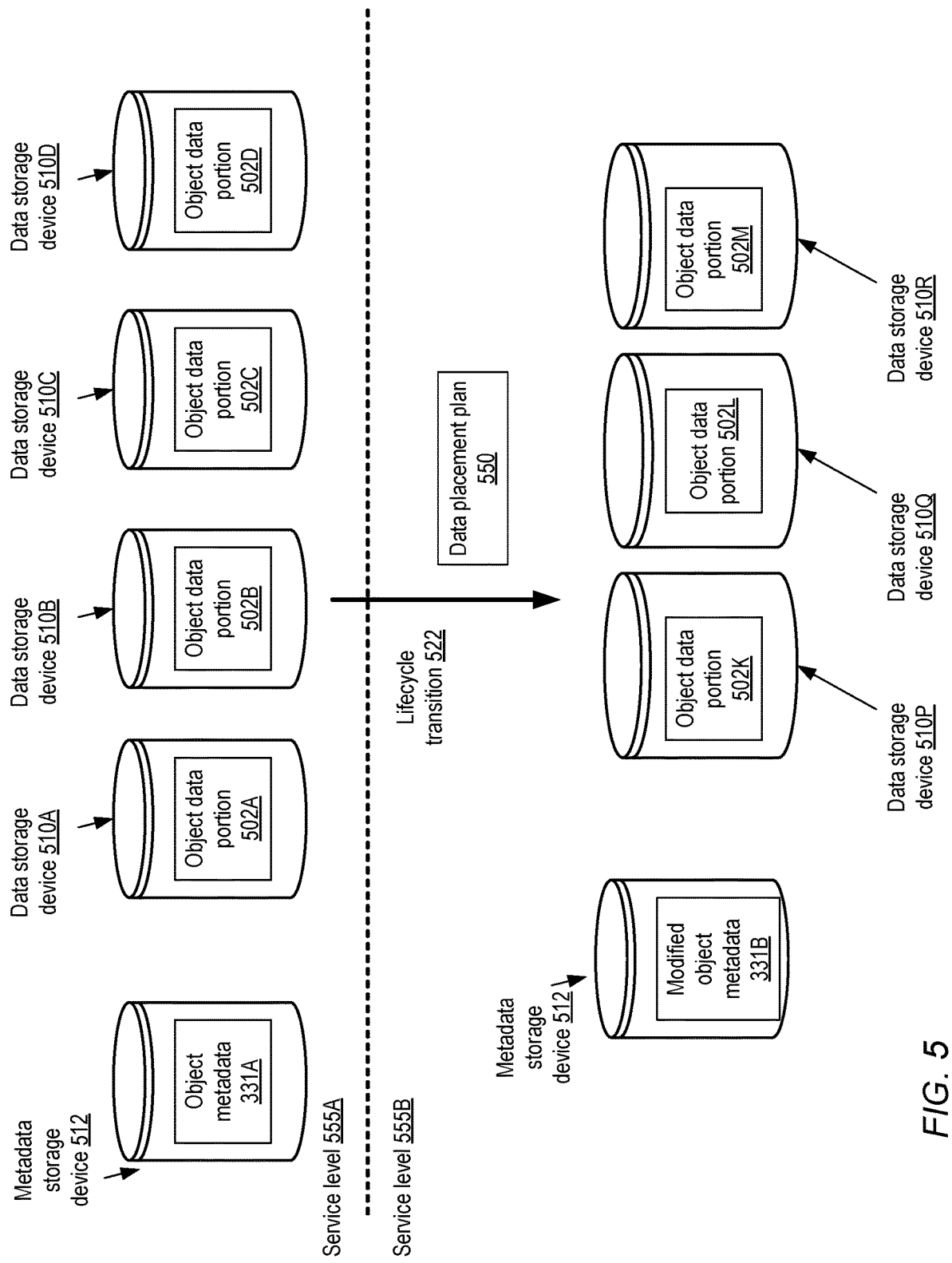
FIG. 5 illustrates an example remapping of object data to storage devices that may be performed during a lifecycle transition, according to at least some embodiments.

FIG. 5 illustrates an example remapping of object data to storage devices that may be performed during a lifecycle transition, according to at least some embodiments. In at least some embodiments, object metadata 331 may generally be stored on different storage devices than object data 333. In addition, in at least some embodiments an object's data 333 may be stored on multiple storage devices, either as replicas, or in the form of distinct subsets of the data that may be manipulated and distributed for availability or other reasons as described below in further detail. During a lifecycle transition, both the metadata and the data of an object may be modified. The data may, for example, be redistributed across a different set of storage devices, and the metadata may be updated to indicate the new service level and the new data locations. In FIG. 5, an example lifecycle transition 522 for a given storage object 133 between service level 555A and service level 555B is illustrated. Initially, in service level 555A, the metadata 331A of the object is stored at one metadata storage device 512, and four data storage devices 510A, 510B, 510C and 510D are used to store respective data portions 502A-D of the object. A "data portion", as the term is used herein, may comprise any subset of the object's data, or the totality of the object's data. For example, in one implementation, four full physical replicas of the object data may be maintained, so that each data portion 502 comprises the entire object data; in another implementation, the object data may be split into fragments, recoded using an erasure coding technique, and distributed across the four data storage devices 510, so that each data portion represents a coded fragment of the object data.

To implement the lifecycle transition 522 from service level 555A to 555B, in the depicted embodiment the lifecycle manager 180 may generate a data placement plan 550 for the affected storage object(s). The data placement plan may identify the distribution methodology or algorithm for the object data 333 in the target service level 555B, as well as the target set of data storage devices at which the object's data is to be stored in accordance with service level 555B. For example, in one scenario, the change from service level 555A to 555B may involve a reduction in the number of replicas from four full replicas to three full replicas, and a different set of storage devices may be designated for data storage in service level 555B than in 555A. Accordingly, in such a scenario the data placement plan may indicate that replicas of the data 333 (i.e., data portions 502K, 502L and 502M) are to be created on storage devices 510P, 510Q and 510R respectively. In another scenario, the transition may involve a change to erasure coding parameters for service level 555B than were used for service level 555A. In this second scenario, the original data may be reconstituted, re-fragmented and re-coded in accordance with the new erasure coding parameters, and the recoded fragments 502K, 502L and 502M may be targeted for storage at devices 510P, 510Q and 510R. In addition to the changes in the data storage locations, the metadata 331A may also be modified to metadata 331B, as shown. In the depicted example, the same metadata storage device 512 is used for service level 555A as was used for service level 555B. However, in some implementations, the object metadata location may also be changed during at least some types of lifecycle transitions (e.g., a metadata placement plan may be generated and a new storage device location for the object metadata, or for replicas or subsets of the object metadata, may be found). It is noted that for some lifecycle transitions in some embodiments, the same storage devices may be used to store data portions of objects at different service levels. That is, while the way the object data (or metadata) is arranged, organized or distributed may differ for different service levels, it may not be necessary to designate different sets of storage devices for different service levels. For example, a data portion 502A at a service level 555A may be stored on a storage device D1, and a data portion 502K at service level 555B may be stored at the same device D1.

In at least some embodiments, erasure coding techniques may be employed to support desired levels of data durability, redundancy, and/or availability for different service levels. Generally speaking, an erasure code may provide redundancy by dividing object data into fragments, performing some set of computations to recode the fragments (which may result in an increase in the number of fragments), and then storing the recoded fragments at different storage locations. The technique used to recode the fragments may have the mathematical property that the original object data may be reconstituted using a subset of the recoded fragments. As a result, the object data may be recovered even in the event a loss of some of the recoded fragments, due for example to power failures or device errors. Erasure coding techniques may be characterized based on parameters such as the number of fragments into which the original data is divided, the number of recoded fragments, the physical distribution of the recoded fragments, and/or the kinds of computations involved in the recoding in various embodiments.

Figure 6:
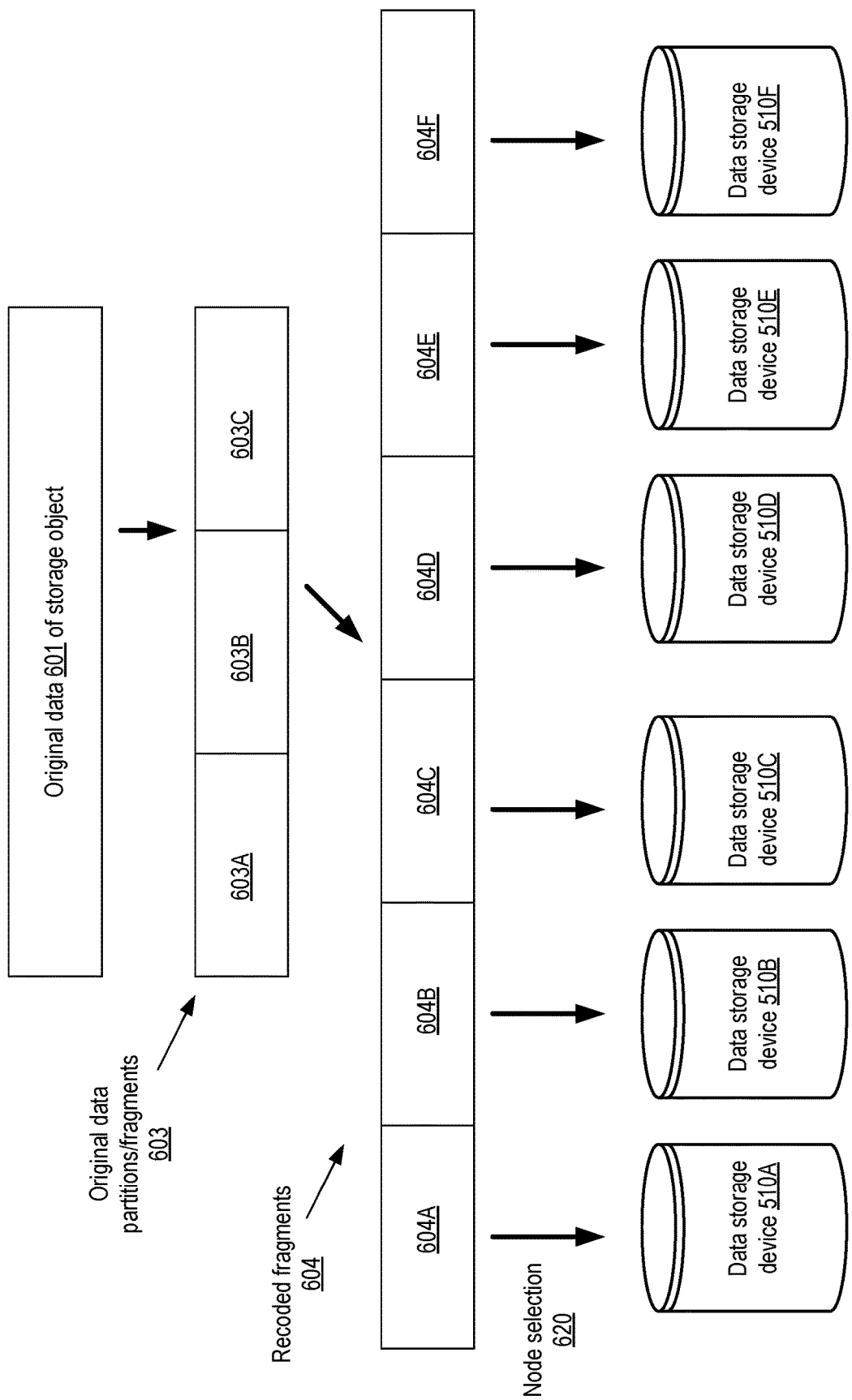
FIG. 6 illustrates an example use of erasure coding for supporting a desired level of data durability in a service level specified in a lifecycle transition, according to at least some embodiments.

FIG. 6 illustrates an example use of erasure coding for supporting a desired level of data durability in a service level that may be specified in a lifecycle transition, according to at least some embodiments. In this example, the original data 601 of the object may be divided into three fragments 603 (e.g., 603A-603C), and then recoded (e.g., mathematically transformed) into six fragments 604 (e.g., 604A-F), such that the original data 601 can be reconstructed even if any three of the fragments are lost. Such an approach may be described as a "6/3" erasure coding scheme. In some implementations, the initial division of the original data 601 into fragments 603 may not be required, e.g., the entirety of the data 601 may be transformed as a unit and then divided into 6 fragments 604 for storage. In the depicted embodiment, each of the recoded fragments 604 is stored at a respective data storage device 510. In some embodiments the data storage devices 510, which may also be referred to as data nodes of the storage service, may be distributed across different physical locations (e.g., racks) within a given data center, across different data centers, or across different geographical regions, e.g., to reduce the likelihood of correlated failures affecting more than one of the recoded fragments. For example, each of the recoded fragments may be stored in a different data center, or no more than two fragments may be stored in the same data center in various implementations. The process of deciding exactly which data storage device 510 is to be used for each of the recoded fragments may be termed "node selection" 620 in some embodiments. Node selection decisions may be based on various factors in different embodiments, such as on metrics of storage utilization levels, space availability levels, network traffic levels, and the like at different storage devices of the service 102. In some embodiments, pools of storage devices may be dedicated to each service level, while in other embodiments, a given storage device may be used for multiple service levels.

When the original object data 601 is to be retrieved, e.g., when a client wishes to read the object, any three of the fragments 604 may be retrieved in the depicted example. The data 601 may be reconstructed for the client by performing the logical inverse of the kinds of data transformations that were initially performed for recoding. When a client modifies the data, depending for example on the extent of the changes, one or more of the recoded fragments may have to be recomputed in some embodiments. Different service levels may use different erasure coding parameters in some embodiments—e.g., a 6/3 scheme may be used to provide one level of durability, while a 12/6 scheme may be used for a service level supporting a higher level of durability in some embodiments. During a transition of a storage object from a 6/3 source service level to a 12/6 target service level in some embodiments, the object's data may be reconstituted using three segments at the source service level, recoded into 12 fragments, and then distributed among selected data storage devices used for the target service level. The original 6 recoded fragments of the source service level may be discarded or deleted in at least some such embodiments, e.g., after verifying that at least 6 of the fragments for the target service level have been successfully written to respective data storage devices. In some cases, the storage service may employ background processes that are constantly examining the data storage devices to determine whether any fragments are lost, to reconstruct or repair objects, etc. In the example shown in FIG. 6, if the number of lost fragments drops close to 3, such background processes may try to drive the number back up to 6 (e.g., by reconstructing the original object and re-fragmenting). Various types of hashing or digital signature techniques may be implemented to ensure that data corruption at any of the fragments can be detected in different embodiments, e.g., a hash value may be stored for each of the fragments and used for data validation. In some embodiments, while summary or high-level information about different levels of durability for different service levels may be provided to the clients, the details of the erasure coding parameters used may not necessarily be revealed to clients. In other embodiments, clients may be informed about the erasure coding parameters being used. It is noted that full replication (without recoding of the kind described above) may be considered an example of erasure coding as well, e.g., a 3/1 erasure coding scheme may represent 3-way replication, in which any one of the 3 replicas can be used to respond to read requests.

In at least some embodiments, at least one service level may be established to store objects 133 that do not need immediate access (e.g., access within a few seconds or milliseconds). Such a service level may be termed a "delayed-access" service level herein. For example, clients may wish to store objects that have not been accessed for a year or more in "delayed-access" storage devices that may typically be kept in a low-power state, or powered off, and may only be brought to full power when requests to access the stored objects (which may typically be rare) are received. In at least some embodiments, delayed-access storage may be implemented using disks similar to those used for service levels that provide faster access, although the physical arrangement of the disks (e.g., the number of disks per rack, the spacing between racks, the cooling infrastructure, or the power infrastructure) used for delayed-access storage may be different from the physical arrangement of the disks used for typical online access. In other embodiments, tape devices or other types of storage may be used for delayed-access storage.

Figure 7:
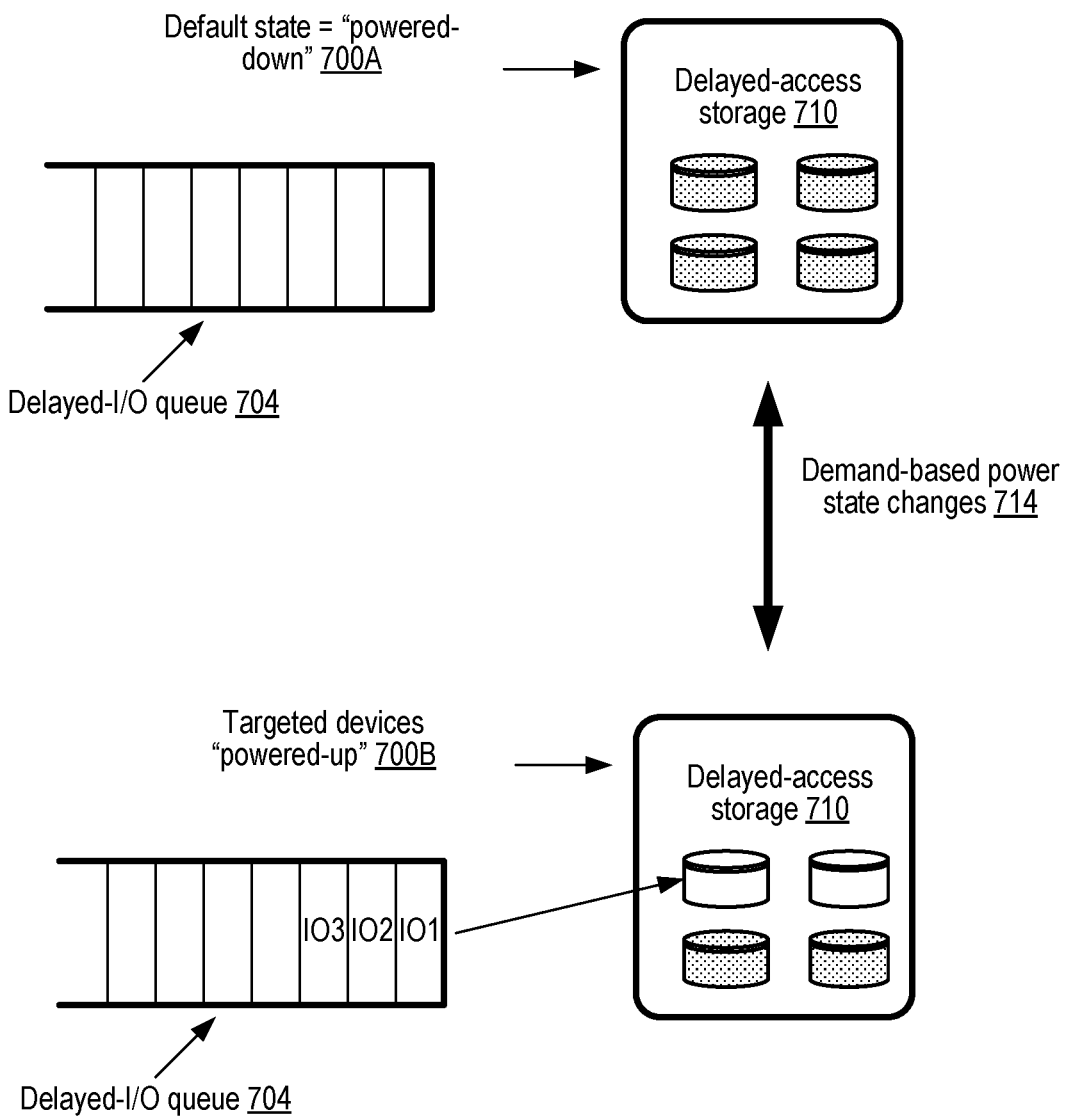
FIG. 7 illustrates an example use of delayed-access storage for a service level specified in a lifecycle transition, according to at least some embodiments.

FIG. 7 illustrates an example use of delayed-access storage for a service level that may be specified in a lifecycle transition, according to at least some embodiments. As shown, a set of storage devices 710 may be designated to store object data that does not require immediate access, and such storage devices may therefore be referred to as delayed-access storage. It is noted that the storage devices used (such as various types of disks) for the delayed access storage may actually be capable of supporting rapid access in at least some embodiments; that is, the delays may be introduced because of the way the devices are used and/or the way I/O operations are scheduled, rather than due to the native capabilities or limitations of the hardware or software used for the devices. In the depicted embodiment, by default the delayed access storage devices 710 may be kept in a powered-down state 700. I/O operations directed at the storage devices 710 may be queued in a delayed-I/O queue 704, and may be performed only during time windows when the power is turned on. As shown, in some embodiments the power state changes 714 may be demand-based—e.g., the power state of at least some of the storage devices 710 may be changed to "powered-up" state 700B based at least partly on the number of queued I/O operations (e.g., IO1, IO2 and IO3) waiting in queue 704. In one embodiment, only the specific subset of storage devices 710 for which I/O operations are queued may be powered up during a given time window. After the queued I/O operations are performed, the storage devices may be brought back into a powered-down state 700A in the depicted embodiment. In some embodiments, clients may be enabled to create special logical containers called "vaults" in delayed-access storage, to which objects of the client's buckets may be copied on demand. An API may be implemented for clients to issue read and write requests for objects stored in delayed-access storage in some embodiments. Using such APIs, a client may, for example, create tasks specifying I/Os to be performed when the delayed access storage is powered up, query the status of the tasks, and receive notifications when the I/Os are performed. Thus, for example, after a lifecycle transition in which a particular storage object 133 is copied to or moved to delayed-access storage, a client may submit an access (e.g., read) request directed at the storage object using the API, the storage service may schedule an operation to bring the appropriate portion of the delayed-access storage online, and the storage service may notify the client when the object 133 becomes accessible. The reduced power costs of delayed-access storage may result in substantially lower billing costs for corresponding service levels than for other service levels supporting immediate access in at least some embodiments.

Figure 8:
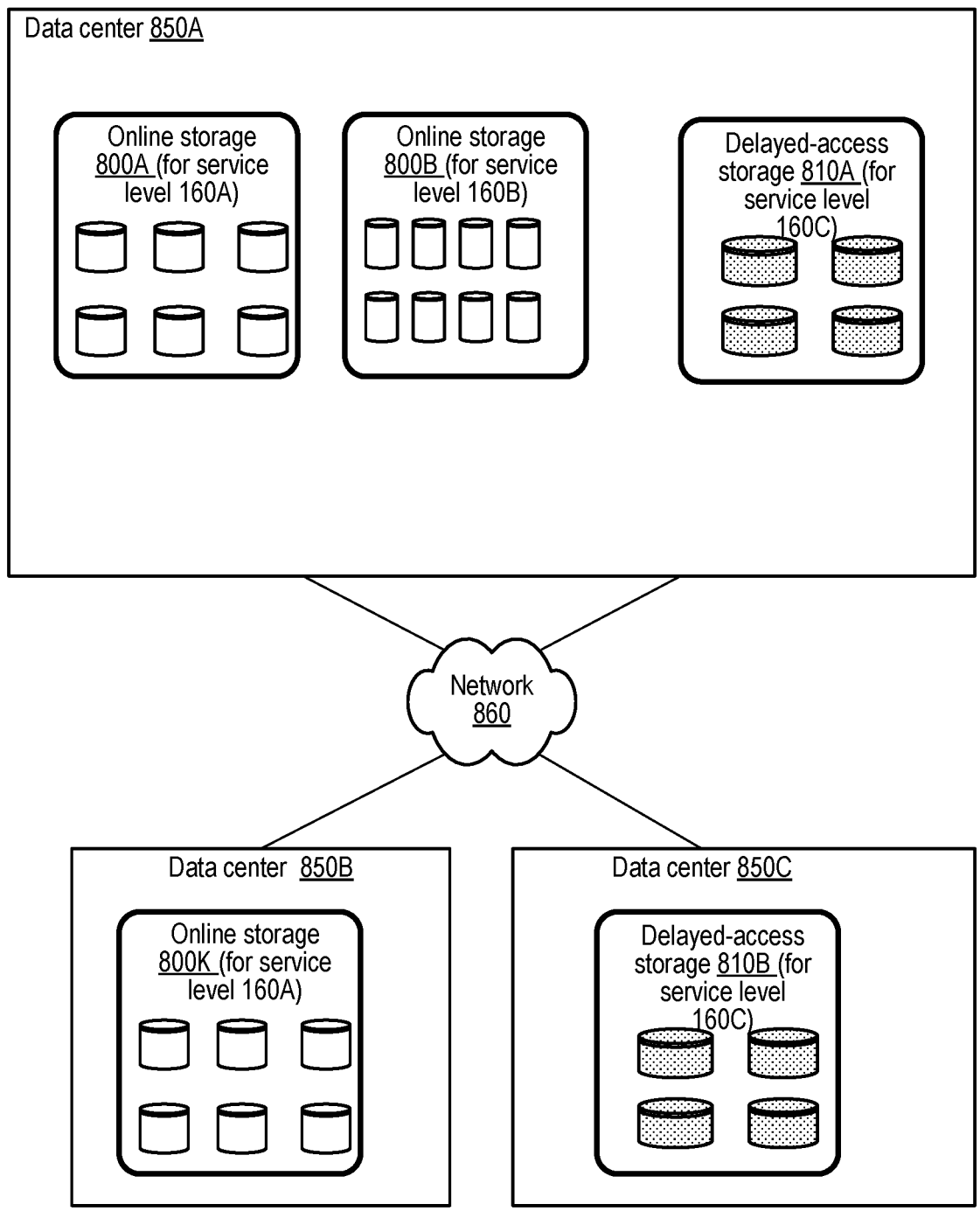
FIG. 8 illustrates a plurality of data centers in which different types of storage devices may be used to support various service levels, according to at least some embodiments.

In some embodiments, numerous data centers, each supporting one or more service levels, may be used for service 102. FIG. 8 illustrates a plurality of data centers in which different types of storage devices may be used to support various service levels, according to at least some embodiments. Three data centers 850A, 850B and 850C are shown, linked by a network 860. The data centers may be distributed geographically across different cities, states, countries and/or continents in some embodiments. Data center 850A is shown with three collections of storage devices, each dedicated for one service level. Online storage (e.g., disk-based storage) 800A may be designated for one service level 160A, a different collection of online storage devices 800B may be designated for service level 160B, and service level 160C may be supported at data center 850A using delayed-access storage 810A. Some data centers, such as 850B and 850C, may support only a single service level—e.g., service level 160A may be supported at data center 850B using online storage 800K, and service level 160C may be supported at data center 850C using delayed-access storage 810B. Generally speaking, any desired set of service levels may be supported at a given data center. In various embodiments in which object metadata 331 includes locator records 464, the locator records for a given object 133 may indicate the location of various recoded fragments stored at one or more data centers according to the currently-used erasure code for the object, or the location of the object's data within delayed-access storage at one or more data centers 850.

In some embodiments, a given storage device may not be restricted to supporting just one service level at a time in the manner illustrated in FIG. 8. In one such embodiment, different instances of the same kind of storage device (e.g., from the same storage vendor, with the same hardware and/or software specifications) may be used to support multiple service levels—e.g., by using different erasure coding parameters, or by controlling power settings in the manner described above with respect to FIG. 7. In some embodiments, more than one delayed-access service level may be supported—e.g., one service level in which the typical delay for a random read is in minutes, and another service level in which the typical delay is in hours. In addition to erasure coding and the power management techniques described above, other approaches may be used to implement different service levels in various embodiments. For example, in some embodiments, different performance levels associated with respective service levels may be supported by using in-memory caches in combination with disk-based devices.

A subset of the storage devices of the service 102 may be dedicated specifically for metadata in some embodiments, while in other embodiments, storage devices may be shared by metadata entries (such as bucket metadata 321 or object metadata 331) as well as object data 333. For example, keymap instances (illustrated in FIG. 9 and described in detail below) may comprise dedicated metadata storage devices in some embodiments. In some implementations, in which each service level supported has a corresponding set of data storage devices, metadata (such as keymap entries) for all the storage objects 133 of the service may be stored on a common set of metadata storage devices—e.g., while the data of a storage object may be moved from one category of storage device to another as part of a lifecycle transition, the metadata may not be moved (although the metadata may be updated to reflect the transition). In other embodiments, both metadata and data may be moved during at least some lifecycle transitions—e.g., if metadata (as well as data) for an object 133 at service level 160A is stored in storage 800A in FIG. 8, the metadata (as well as the data) may be moved to storage 800B when the object's service level changes to 160B in such an embodiment.

Example Storage Service Architecture

Figure 9:
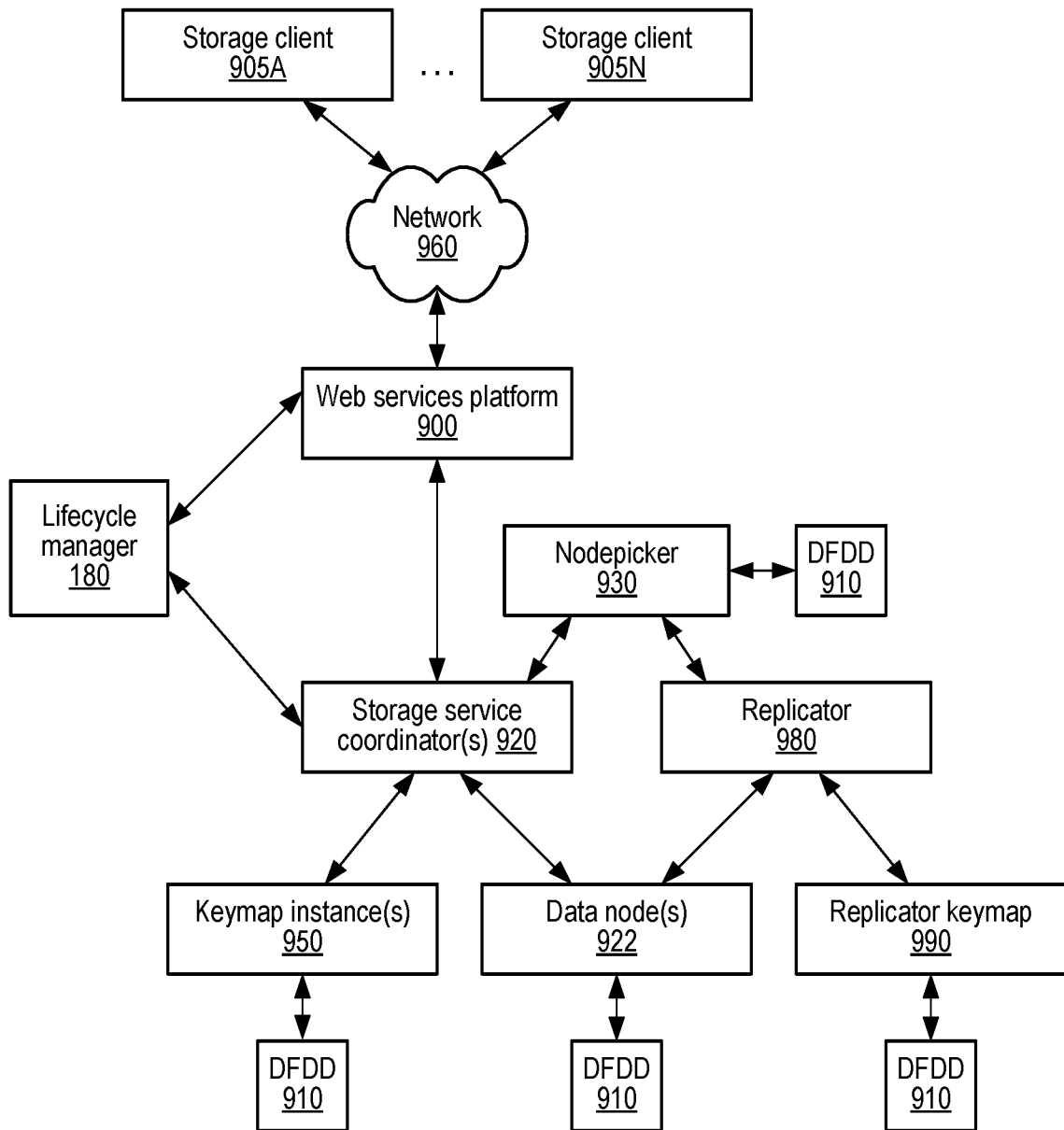
FIG. 9 illustrates an example of an architecture of a storage service supporting lifecycle transitions, according to at least some embodiments.

FIG. 9 illustrates an example of an architecture of a storage service 102 supporting lifecycle transitions of the kinds described above, according to at least some embodiments. As shown, a number of storage clients 905A-N may be configured to interact with a web services platform 900 of a storage service 102 via a network 960. Web services platform 900 may be configured to interact with one or more instances of a storage service coordinator 920 (or simply, coordinator(s) 920). Storage service coordinators may interact with various components of the service 102 including lifecycle manager 180, as well as keymap instances 950 (at which object metadata 331 for storage objects 133 is stored) and data nodes 922 (at which data 333 of objects 133 is stored). Keymap instance(s) 950 may comprise metadata storage devices 512 of FIG. 5, while data nodes 922 may comprise data storage devices 510 of FIG. 5 in some embodiments. Additionally, a replicator 980 may also be configured to interact with data nodes 922 as well as a replicator keymap instance 990. Coordinator(s) 920 and/or replicator 980 may interact with a nodepicker service 930. In the illustrated embodiment, each instance of nodepicker 930, keymap 950, data nodes 922 and the replicator keymap 990 may be associated with a respective instance of a discovery and failure detection daemon (DFDD) 910. DFDDs 910 may be responsible for keeping track, e.g., using periodic heartbeat messages or other mechanisms, of the state of the other components (e.g., whether a given node is responsive or unresponsive) and distributing such state information within the storage service as needed. It is noted that where one or more instances of a given component may exist, reference to that component below may be made in either the singular or the plural. However, usage of either form is not intended to preclude the other.

Storage clients 905 may encompass any type of client configurable to submit web services requests (such as REST-style requests) to web services platform 900 via any suitable network 960 in the depicted embodiment. Web services platform 900 may be configured to implement one or more service endpoints configured to receive and process web services requests, such as requests to access or modify objects 133 stored by the storage service. For example, web services platform 900 may include hardware and/or software configured to implement the endpoint "http:// <StorageServiceName>.<DomainName>.com", such that an HTTP-based web services request directed to that endpoint is properly received and processed. In one embodiment, web services platform 900 may be implemented as a server system configured to receive web services requests from clients 905 and to forward them to coordinator(s) 920 or to other components of the storage service for processing. In other embodiments, web services platform 900 may be configured as a number of distinct systems (e.g., in a cluster topology) implementing load balancing and other request management features configured to dynamically manage large-scale web services request processing loads.

Coordinators 920 may be configured to coordinate activity between web services platform 900 and other components of the storage service. In one embodiment, the primary responsibilities of coordinators 920 may include conducting read and write activity of object data 333 and metadata 331 for objects 133 in response to web services requests directed to those objects. For example, object read access may involve performing an access to a keymap instance 950 to retrieve locators that indicate the data nodes 922 where replicas or fragments of a given object 133 are stored, followed by performing an access to a particular data node 922 in order to read the requested data. Similarly, object creation or modification may involve storing a number of replicas or fragments of objects 133 to various data nodes 922 and updating keymap instance 950, if necessary, to reflect the locators of the created or modified replicas or fragments. In some cases (e.g., when the object is currently stored in delayed-access storage) an I/O may involve a potentially long delay; in such scenarios, the requesting client may initially be notified that a task comprising an indication of the I/O request has been queued, and notified when the I/O is eventually performed.

In some embodiments, coordinators 920 may be configured to perform these read and write operations to keymap instances 950 and data nodes 922. However, it is noted that in certain embodiments in which a number of replicas (either physical replicas or logical replicas using some form of erasure coding) of storage objects are maintained for a given service level, coordinators 920 may not operate to create the full number of desired replicas of an object 133 at the time of its creation or modification. In some embodiments a write operation to an object 133 may be considered complete when coordinators 920 have completed writing a certain number of replicas of that object 133 (e.g., two replicas). Further replication of that object 133 may be completed as an out-of-band or asynchronous operation by replicator 980. That is, in such embodiments, the in-band or synchronous portion of the object creation or modification operation may include the generation of fewer than the total desired number of replicas of the affected object 133. It is noted that while coordinator 920 is illustrated as a distinct component from keymap instances 950, data nodes 922, and other system components, it is possible in some embodiments for an instance of coordinator 920 to be implemented together with another storage service component (e.g., as software components executable by a single computer system), including for example a lifecycle manager 180. Thus, although the description herein may refer to coordinator 920 storing or retrieving data to or from a data node 922, a keymap instance 950, or another component, it is understood that in some embodiments such processing may occur within shared computing system resources. In the embodiment depicted in FIG. 9, lifecycle manager 180 (or its subcomponents) may be configured to interact with coordinator(s) 920 and/or with web services platform 900 to perform various operations, such as to identify storage objects 133 that are candidates for lifecycle transitions, create or access transition job objects, and the like. In some embodiments, some subcomponents of the lifecycle manager 180 may use the programmatic interfaces supported for external clients by web services platform 900, while other subcomponents may interact with the coordinator(s) 920, communicate directly with keymap instances 950 and/or data nodes 922, or use multiple types of interactions with other storage service components to accomplish their operations. Worker threads (not shown in FIG. 9) that may initiate operations to implement lifecycle transitions in various embodiments may also interact either with the storage service coordinators 920, the web services platform 900, or the other components depicted in FIG. 9. In at least some embodiments, the types of storage service operations requested by lifecycle manager 180 may be semantically and/or syntactically similar to the types of operations requested by clients 905A-905N. Accordingly, the lifecycle manager 180 and/or its subcomponents may be termed "internal clients" of storage service 102, while clients 905A-905N may be termed "external clients" of the service.

As mentioned above, instances of objects 133 may be logically or physically replicated across different data nodes 922, in accordance with one or more service level definitions (e.g., to meet durability and/or availability requirements associated with the service levels). Object replication within the storage service presents several opportunities for management and optimization that may be addressed in the illustrated embodiment by nodepicker 930 and replicator 980, as follows. When coordinator 920 receives a request to write an object 133, it may correspondingly write object 133 to a given number of data nodes 922 before declaring the write to be complete. However, the number and particular selection of nodes 920 to which object 133 should be written may vary depending on a number of different storage policy considerations. For example, requiring that a certain minimum number of replicas (e.g., two or three) of object 133 have been successfully written before the write operation is considered to be completed may be prudent in order for the written data to be durable in view of possible failures. However, it may also be desirable to ensure that the data nodes 922 chosen to store the minimum number of replicas are distributed among different possible loci of failure. For example, data nodes 922 that are located in the same data center may be more likely to fail concurrently (e.g., due to a catastrophic failure such as a natural disaster, power failure, etc.) than nodes that are geographically separated.

Nodepicker 930 may help in deciding which specific nodes should be used for a particular operation in at least some embodiments. Nodepicker 930 may be configured as a service accessible by coordinator 920, replicator 980, lifecycle manager 180, or other components of the service 102, that may implement algorithms for selecting data nodes 922 for object read and write operations in various embodiments. In one embodiment, the node selection operations 620 (shown in FIG. 6) to determine which data storage devices should be used for storing various recoded fragments during erasure coding may be performed by the nodepicker 930. In some embodiments, in the case of writing/deleting an object 133, nodepicker 930 may operate to develop a data placement plan 550, or a particular sequence of data nodes 922 to which the object 133 should be written, or from which the object 133 should be deleted.

In developing a particular plan, nodepicker 930 may be configured to ensure that the plan has a reasonable chance of succeeding—for example, that the data nodes 922 specified in the plan are in fact operational and are expected to have sufficient storage resources available to accept the object 133—and that the plan, if completed, would satisfy all storage policies pertinent to the service level being implemented. In some embodiments, nodepicker 930 may also assist coordinators 920 in reading objects 133, e.g., by identifying the node 920 that may offer the best read performance available to the reading coordinator 920. To develop data placement plans and to advise coordinators 920 with respect to object read operations, nodepicker 930 may be configured to monitor the state of nodes 920, e.g., with respect to their operational status and available resources. In one embodiment, nodepicker 930 may be configured to interact with an instance of DFDD 910 in order to identify the nodes 920 within the storage service that are currently operational.

As mentioned above, the reliability and availability of object data may be increased by replicating objects 133 throughout the storage service, e.g., using full replication or other erasure coding approaches. For example, distributing instances or replicas of objects 133 within a geographically-dispersed system may improve the performance of similarly-dispersed clients 905 that attempt to access such objects 133 by possibly locating some object instances closer to such clients. (It is noted that in the context of object replication, the terms "instance" and "replica" may be used interchangeably herein.) Further, object replication may generally decrease the chances of data loss resulting from destruction of a particular object instance. However, it may be the case in some embodiments that at a given point in time, the number of valid replicas of an object 133 may be less than a desired or target number of replicas. For example, a replication storage policy to be enforced across the storage service may specify that a particular target number of replicas of each object 133 (e.g., 3 or any other suitable number) should exist at any given time. However, for a given object 133, the actual number of valid replicas might be less than the target number, for a variety of reasons. For example, a previously valid replica may become inaccessible due to a failure of the device on which it was stored. Alternatively, in some embodiments the number of instances of an object 133 that are written by a coordinator 920 may be less than the target number of replicas for that object 133. For example, as described above, the instances may be written according to a data placement plan specified by nodepicker 930, which may take into account a durability policy that requires fewer instances than the target number.

In one embodiment, replicator 980 may operate to examine objects 133 to determine whether the number of valid replicas of each object satisfies a target number for a given service level (e.g., whether the number of replicas is at least the target number at the time the determination is made). Specifically, in one embodiment, replicator 980 may be configured to continuously iterate over records specifying the number and location of instances of each object 133. For example, replicator 980 may reference the replicator keymap 990, which, like keymap instances 950 described in greater detail below, may be configured to store mappings between object keys and corresponding locators identifying replicated object instances. (In other embodiments, replicator 980 may consult one of keymap instances 950 rather than a dedicated instance of the keymap.) In some embodiments, it is contemplated that multiple instances of replicator 980 may be configured to concurrently examine different portions of the keymap space, which may reduce the overall amount of time required to examine the status of all objects 133 managed by the storage service. If replicator 980 determines that the target number of valid replicas is not satisfied for a given object 133, it may be configured to write additional replicas of the given object 133, in a manner similar to coordinator 920 performing a write operation to the given object 133. In some embodiments, replicator 980 or an analogous component of storage service 102 may also be configured to ensure that, in response to a scheduled deletion operation or a client-requested immediate deletion operation, all the replicas of a storage object are eventually deleted, even if only a subset of replicas is deleted initially by a coordinator 920. It is noted that in some embodiments, certain objects 133 need not be stored with any degree of replication or fault tolerance at all, depending on the service level. For example, a client may request that an object 133 be stored at a service level with minimal fault tolerance, possibly at lower cost than for a higher degree of fault tolerance.

Generally speaking, keymap instances 950 may provide records of the relationships between keys of objects 133 and locators of particular instances or replicas of objects 133. In storing such records, keymap instances 450 also reflect the degree to which objects 133 are replicated within the storage service (e.g., how many instances of an object 133 exist, and how they may be referenced). Data nodes 922 may generally provide storage for individual instances of objects 133 as identified by locators. However, a given data node 922 may be unaware of the state of an instance with respect to any other data nodes 922, or of the relationship between an instance's locator and the key of its corresponding object 133. That is, generally speaking, the state information maintained by keymap instances 950 may be transparent to data nodes 922. In the depicted embodiments, DFDD instances 910 may operate to detect and communicate state information regarding the operational status of data nodes 922 and/or keymap instances 950 (and replicator keymap 990, if implemented), such that clients of DFDD 910 such as coordinators 920 and replicator 980 may obtain an accurate, though possibly delayed view of the detected status. It is noted that although the various components of the storage service illustrated in FIG. 9 are shown as distinct entities, in at least some embodiments some or all of the illustrated components may be implemented at a single computer server and/or as respective modules of a single software program. In some embodiments, multiple instances of lifecycle manager 180 may be implemented.

Synchronization Protocols

Keymap entries may be replicated in some embodiments at various nodes and physical locations in distributed physical deployments of the storage service. Any of a number of techniques for replica synchronization or conflict resolution may be implemented in such embodiments. In one embodiment, synchronization of replicas may be performed using a suitable version of a quorum protocol. Generally speaking, an update or modification of replicas of keymap data (including keymap entry put and delete operations) performed according to a quorum protocol may be deemed complete with respect to a requesting client (or service component) when the modification has been durably (e.g., completely and persistently) performed with respect to at least a quorum number of replicas. Similarly, a keymap entry get operation performed according to a quorum protocol may be deemed complete when the same data has been read from at least a quorum number of replicas. In some embodiments, the quorum number may be defined as a simple majority of the number of replicas present, while in other embodiments arbitrary degrees of supermajority may be employed. It is noted that a quorum protocol operation may fail to complete if the quorum requirement is not met. However, if the quorum number of replicas is smaller than the total number of replicas, the probability of a given quorum protocol operation failing may be less than that of an atomic protocol operation that requires a consensus among replicas rather than a quorum. It is noted that quorum protocols other than the one described herein may be employed by keymap instances 950 in some embodiments. For example, a multiphase commit protocol such as Paxos or two-phase commit may be employed to implement quorum-type keymap semantics.

In the course of normal operation of read and update operations according to a quorum protocol, it is possible for an update to fail to be propagated to every replica, for example due to communication failures or failure of resources underlying a replica. In one embodiment, disagreement among replicas may be detected and repaired during a read operation. Specifically, if different values are detected among different replicas of a particular entry during a keymap entry get operation, a keymap put operation may be generated to reconcile the difference. In one embodiment, the entry used as the basis for the put operation may be the entry with the most recent (e.g., numerically or lexicographically highest) associated sequence number or timestamp among the different values read. Thus, discrepancies among replicas may be resolved "on the fly," e.g., as keymap entry get operations are processed, without requiring a distinct process or operation to repair the discrepancies.

Strong consistency protocols such as the above-described quorum protocols or atomic protocols may be employed when updating replicas to effectively prevent clients from observing replica inconsistency or to prevent such inconsistency from arising at all. However, in a distributed context where access latency of different replicas may vary, sometimes considerably, strong consistency protocols may have a high performance cost. For example, for an atomic or quorum protocol, the time required for operation completion may be a function of the time required to complete the operation with respect to the slowest of all the replicas or of the quorum number of replicas, respectively. In addition, depending on the locality and temporal sequence of storage service operations, the likelihood of an inconsistency being encountered by a given internal or external client may not be very high in at least some embodiments.

Figure 10A:
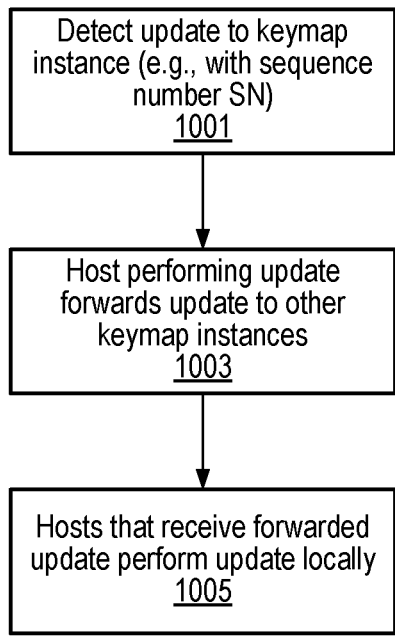
FIG. 10A is a flow diagram illustrating aspects of update propagation operations that may be implemented in at least some embodiments.
Figure 10B:
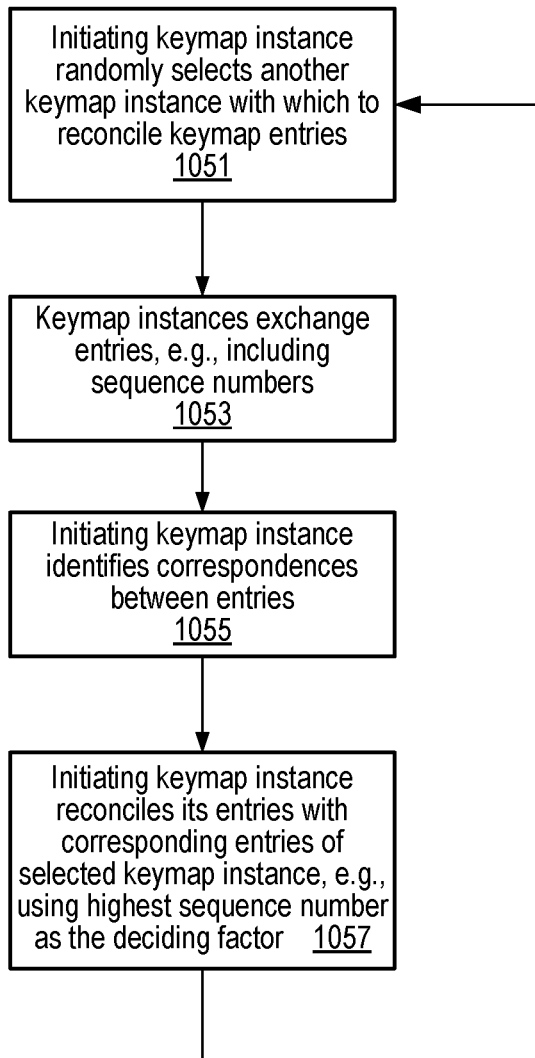
FIG. 10B is a flow diagram illustrating aspects of reconciliation operations that may be implemented in at least some embodiments.

In some embodiments keymap instances 950 may accordingly employ a relaxed synchronization protocol that strives to converge keymap instances 950 to a consistent state, but which may allow some degree of inconsistency among keymap instances 950 at any given time. Such a synchronization protocol may provide better overall performance for the majority of internal or external clients for which stricter synchronization may be unnecessary. In some embodiments, relaxed synchronization protocols among keymap instances 950 may include a combination of different synchronization tasks that may independently carry out different aspects of the synchronization process. FIG. 10A is a flow diagram illustrating aspects of update propagation tasks that may be implemented as part of such a relaxed synchronization protocol according to at least some embodiments. FIG. 10B is a flow diagram illustrating aspects of reconciliation operations that may be implemented as part of the relaxed synchronization protocol in such an embodiment.

As shown in element 1001 of FIG. 10A, an update to one of keymap instances 950 may be detected with a particular sequence number SN. For example, a keymap instance 950 may receive and complete a keymap entry put or delete operation according to a quorum protocol as described above. The keymap instance 950 that processed the keymap update may then forward the update operation to each other keymap instance 950 provisioned within the storage service (element 1003). For example, if keymap instance 950A processed a keymap entry put operation, it may forward the operation including arguments, parameters, sequence number, etc. to keymap instances 950B and 950C. In one embodiment, the forwarding may be performed without verification or acknowledgement. Any suitable forwarding strategy may be used in various embodiments, such as concurrent broadcast from the originating keymap instance 950 to multiple other instances, sequential forwarding from the originating keymap instance to other instances, tree-based strategies, etc.

Those keymap instances that receive the forwarded operation may perform the update operation locally (block 1005). For example, if keymap instance 950B successfully receives a keymap entry put operation forwarded from instance 950A, it may perform the operation as if it had received the operation from any internal or external keymap client. If the put operation successfully completes, keymap instances 950A and 950B may be synchronized with respect to the put operation.

Generally speaking, it may be expected that forwarding keymap update operations as illustrated in FIG. 10A will succeed a majority of the time. Therefore, minimizing the overhead involved in forwarding such operations may decrease the time and/or bandwidth required to achieve synchronization among keymap instances 950 in a majority of cases. For example, eliminating acknowledgement responses or other types of protocol verification or handshaking from the forwarding process may free communications bandwidth for other uses, such as to support a larger scale of keymap implementation involving a greater degree of synchronization traffic. In many instances, the time required to propagate keymap updates throughout a keymap deployment (which may generally correspond to the window of potential inconsistency of replicas of a given keymap entry) may be limited to the communication latency required to forward the operation to associated keymap instances and the processing latency required for the instances to apply the forwarded operation. Frequently, this total time may be on the order of seconds or fractions of seconds.

In some cases, however, forwarding of keymap update operations among keymap instances 950 may fail. For example, a communication link failure may render one host or server on which a keymap instance is implemented unreachable from another, or may cause a forwarded operation to be lost, truncated or otherwise damaged in transit. Alternatively, a destination host may fail to receive or correctly process a properly forwarded update operation, for example due to transient hardware or software issues. If, as in one embodiment, no attempt is made on the part of an originating keymap instance to verify or assure that forwarded keymap update operations are successfully received and processed, forwarding failure of individual operations may result in inconsistency among keymap instances 950 with respect to certain entries.

Accordingly, in at least one embodiment a relaxed synchronization protocol among keymap instances 950 may include an anti-entropy or reconciliation task shown in FIG. 10B. This task may be referred to as an "anti-entropy" task in that generally, operation of the task may serve to reduce differences and increase similarities among different keymap instances 950, thus decreasing the overall entropy among keymap instances 950 that may be introduced by random or systemic failure of update propagation to properly synchronize instances. In the illustrated embodiment, as shown in element 1051, an initiating keymap instance 950 may randomly select another keymap instance with which to perform a reconciliation of a particular set of keymap entries.

The initiating keymap instance 950 may then exchange information about the entries with the selected keymap instance (element 1053). For example, copies of an index maintained within each instance (which may include sequence numbers for various modification operations of objects 133 included in the instance) may be exchanged. Based on the exchanged information, the initiating keymap instance 950 may then identify correspondences between entries in the two instances (element 1055) and may reconcile each entry within the initiating keymap instance 950 with a corresponding partition within the selected keymap instance 950 (element 1057), e.g., using the modification sequence numbers to resolve conflicts.

Once partition reconciliation between the two keymap instances 950 has completed, operation may continue from element 1051 where the reconciliation process is initiated again with respect to another random keymap instance 950. In various embodiments, each keymap instance 950 may be configured to perform this process at predetermined or dynamically determined intervals. For example, reconciliation may occur at a static rate of once per minute, or at intervals determined according to a random or other statistical probability distribution. In some embodiments, reconciliation may be performed after a certain number of keymap accesses have occurred, or after access to certain individual ones, types or groups of keymap entries has been detected.

The methods of update propagation and reconciliation or anti-entropy shown in FIGS. 10A-10B may operate in a complementary fashion. Under the majority of circumstances, update propagation may satisfactorily synchronize different keymap instances 950 within a deployment. In those instances where keymap inconsistencies arise due to the failure of update propagation, the anti-entropy task may generally operate to reconcile such inconsistencies. It is noted that in some embodiments, execution of the anti-entropy task may not guarantee that two keymap instances 950 are precisely synchronized in their entirety. However, in one embodiment the anti-entropy task may be implemented to guarantee that its operation will not increase the degree of inconsistency between two keymap instances 950. Thus, over repeated applications, the anti-entropy task may facilitate convergence of keymap instances 950. The kinds of relaxed synchronization protocols described above largely in the context of keymap modifications may also be applied to other types of information in the storage service in at least some embodiments, such as to lifecycle policy modifications, lifecycle policy application metadata and the like. For example, an update to a lifecycle policy (or to an indication that a lifecycle policy is applied to a particular bucket) may be made at one node and propagated to other nodes, and reconciliation may be used to resolve conflicting lifecycle policy metadata instances.

In at least some embodiments, a storage service 102 with the type of distributed architecture illustrated in FIG. 9, configured to use the update propagation and reconciliation techniques illustrated in FIG. 10A-10B, may include support for a lifecycle manager 180 that implements lifecycle transitions in accordance with client-specified lifecycle polices. Various aspects of the functionality of such a lifecycle manager 180, and examples of components of such a lifecycle manager, are described below.

Lifecycle Manager Components

Figure 11:
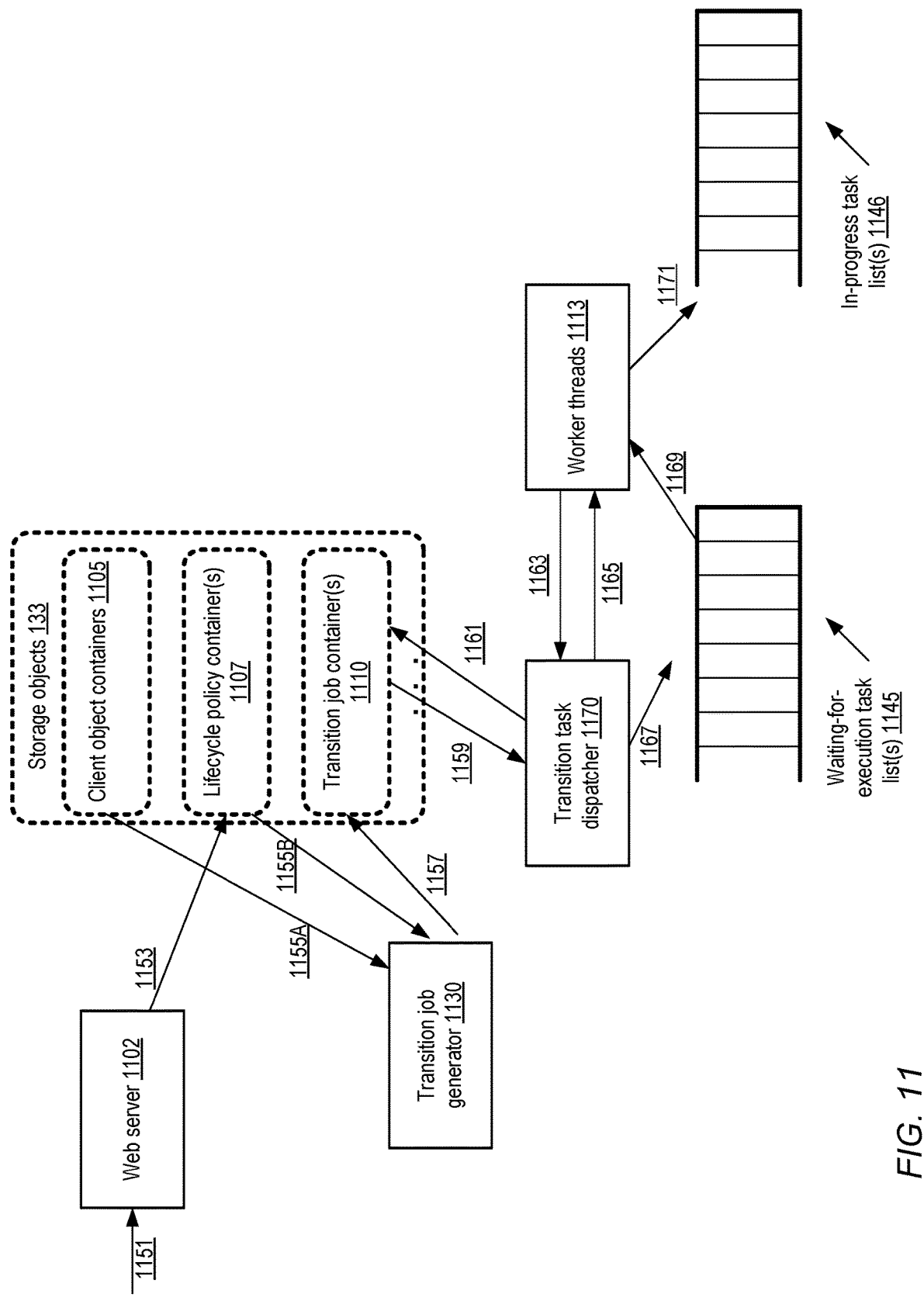
FIG. 11 illustrates examples of interactions between components of a lifecycle manager configured to implement lifecycle transitions for storage objects, according to at least some embodiments.

FIG. 11 illustrates examples of interactions between components of a lifecycle manager configured to implement lifecycle transitions for storage objects, according to at least some embodiments. In the depicted embodiment, storage service 102 may include several different logical containers to store objects involved associated with lifecycle transitions. Client object containers 1105 (such as buckets, or other lower-level containers within buckets) may be used to store client-created storage objects to which lifecycle policies may be applied. The lifecycle policies themselves may be stored as first-class objects within the storage service (e.g., as objects which may generally be accessed using the same kinds of programmatic interfaces as are implemented for external clients, such as the REST "get" and "put" interfaces described earlier), e.g., in lifecycle policy container(s) 1107. In addition, transition job objects (each indicating a group of storage objects that are candidates for transitions) may be stored as first-class storage objects in some embodiments, e.g., in transition job containers 1110.

Several different types of components of the lifecycle manager 180 may collectively be configured to implement transitions based on the lifecycle policies. A web server component 1102 may implement one or more programmatic interfaces enabling external clients 905 to specify or define lifecycle policies, as indicated by arrow 1151. For example, one or more APIs (including for example REST APIs as described below with reference to FIG. 12) may be supported for indicating lifecycle policy definitions in some embodiments. The policies received at the web server 1102 may be validated, e.g., checked for syntactical correctness in accordance with a supported specification for lifecycle policies, and valid policies may be stored in lifecycle policy container(s) 1107, as indicated by arrow 1153. In at least some embodiments in which multiple lifecycle policies may be applied to the same storage objects, the lifecycle manager 180 (e.g., using a special plugin of web server 1102 or using some other component) may check, before accepting a given lifecycle policy, that it does not conflict with an existing lifecycle policy (e.g., by indicating a different transition for a given transition criterion than is indicated in the existing policy). If a conflict is identified, the client may be notified, or one of the conflicting policies may be ignored or rejected in some embodiments, e.g., an older policy may be assumed to supersede the newer one in some implementations.

One or more transition job generators 1130 may be configured to perform iterations of transition candidate discovery, with each pair of successive iterations separated by periods of dormancy during which the corresponding job generator remains inactive. In at least one embodiment, transition candidate discovery operations may be performed as part of a billing or accounting operation or iteration—e.g., the transition job generator may be implemented as a module of an accounting component of the storage service. In such an embodiment, the accounting component may be configured to determine how much clients should be billed based on how many storage objects they have, how many I/O operations were performed and so forth, and the transition candidate discovery iteration may be performed concurrently with, or as part of, a billing/accounting iteration. A transition job generator may, during a given discovery iteration, read one or more transition policy objects from container(s) 1107 (arrow 1155B), and then retrieve metadata (e.g., keys) associated with client-created objects (from client object containers 1105) that are found to be eligible for lifecycle transitions as per the policies (arrow 1155A). Depending on the number of transition-eligible candidates found, the transition job generator(s) 1130 may create a number of transition job objects and store them in container(s) 1110 (arrow 1157). A transition candidate discovery iteration may be initiated based on any combination of various factors in different embodiments—e.g., based on a predetermined schedule, based on the a schedule of a billing module or component configured to determine storage-related billing amounts for clients, based on performance, resource utilization or space utilization conditions in the storage service, based on a backlog of job objects for which transitions are yet to be performed, based on how long it took to complete previous iterations, and so on. For example, in one straightforward implementation, a transition job generator may be configured to perform candidate discovery iterations once every 24 hours, so that an iteration may be started at, say, 2:00 AM every night. The number of transition job objects that are created in a given iteration may depend on, for example, a maximum job size (i.e., a maximum number of transition candidate objects that a given job is allowed to indicate), which may be tunable in some embodiments. The overhead of job object storage, and/or the overhead of scheduling tasks to accomplish the desired transitions, may be among the factors considered when deciding how to distribute candidates among jobs in some embodiments. In at least some embodiments, a plurality of transition job generators 1130 may be implemented, e.g., with each of the generators configured to identify candidates for transitions from a respective service level, or with each of the generators configured to identify candidates among a given subset of storage objects 133 of the service.

In some embodiments, the names of the containers 1110 in which jobs are stored may be determined using a priority-based naming scheme—e.g., a bucket name may include an indication of the priority of the transitions for objects indicated in the jobs of that bucket, relative to the priorities of transitions of other objects indicated in jobs of other buckets. In at least one implementation, the priority may be indicated by including a time indicator (e.g., a timestamp string indicating a target transition time of at least one object in one job of the bucket) in the bucket's name and/or in the job name, such that it may be possible to sort transition candidate objects based on their transition priorities. In at least some embodiments, the storage service may enable clients to provide preferences regarding the priority of transitions of various objects—e.g., clients who consider it critical that an object be moved from service level S1 to service level S2 within X minutes or hours of transition criteria being met may indicate a high priority P1, while other clients who may not consider the timeliness of the transitions as important may indicate a medium or low priority P2, and such priorities may also be indicated in the names of the buckets or jobs. In at least one embodiment, clients may be billed differently for higher-priority transitions than for lower-priority transitions. In some embodiments, respective containers 1110 may be created for each type of transition—e.g., one container may be used to store jobs for transitions between service levels S1 and S2, another may be used to store jobs for transitions between service levels S3 and S4, and so on.

Transition task dispatchers 1170 may also perform their functions in execution iterations separated by periods of sleep or dormancy in the depicted embodiment. Various factors may lead to the initiation of an execution iteration, such as a schedule, an indication that a threshold number of job objects are ready for execution, resource utilization or storage utilization levels of the service, and so on, in different embodiments. In some embodiments a candidate discovery iteration may be initiated based on a status of a transition execution iteration, or a transition execution iteration may be initiated based on the status of an earlier-initiated candidate discovery iteration. During a given execution iteration, a dispatcher 1170 may examine some set of job objects in container(s) 1110 (e.g., using the priority-based naming scheme to decide which jobs to examine first), as indicated by arrow 1159. The dispatcher may reject certain job objects if they do not meet validity criteria in some embodiments—for example, jobs that were created more than X days ago may be rejected, on the assumption that any transition candidates listed in those jobs would have been relisted by the transition job generator 1130 in a different, newer, job object. For a job object that is valid, the dispatcher may place one or more tasks on one or more waiting-for-execution task list(s) or queue(s) (arrow 1167) in the depicted embodiment. The set of tasks listed or enqueued for a given job object (where the set of tasks for a job may comprise just one task in one straightforward implementation, and more than one task in other implementations) may collectively contain indicators, such as keys, of all the candidate objects of the job object, as well as indications of the type of transition operations required. The mapping of transition job objects to tasks (e.g., how many and which specific candidate objects should be included in a given task) may also be dynamically tuned or varied in some embodiments, depending on considerations such as resource availability, locality of the objects (e.g., objects that belong to the same logical container may be placed in the same task in preference to other objects), etc. Tasks may be ordered within the waiting-for-execution list 1145 using a variety of policies in different implementations, such as for example, being randomly positioned in the list, or being positioned in priority order.

One or more resources, such as worker threads 1113, may be assigned for a job or for a set of jobs, as indicated by arrow 1165. In some embodiments, the transition task dispatcher may utilize a fairness policy to assign resources to tasks, in an attempt to ensure that transitions of some clients' objects are not crowded out or delayed because other clients have large numbers of transitions pending. A worker thread may remove a task from a waiting-for-execution list or queue 1145 (arrow 1169), e.g., in first-in-first-out (FIFO) order or in some other order, and place it in an in-progress list or queue 1146 (arrow 1171) in the depicted embodiment. The worker thread may then initiate transition operations (e.g., metadata modification operations and/or data modification operations) for the objects in the task.

In some embodiments, a deletion of a storage object, which may be one of the goals of a lifecycle transition, may comprise one or more metadata deletion operations (in each of which, for example, a keymap entry is deleted) and one or more storage release operations (in each of which storage used for the object's data is released). In at least some such embodiments, the worker threads may only be responsible for metadata deletion operations, with the storage space release operations for the objects being initiated asynchronously by other components such as coordinators 920. In other embodiments, worker threads may initiate both metadata deletions and storage space release operations. Similarly, in some embodiments, for transitions between service levels (i.e., transitions that do not involve deletion) worker threads may be responsible for initiating only the metadata modifications, with the corresponding data modifications (such as increasing the number of replicas of the data, or recoding the data in accordance with different erasure coding parameters) being performed asynchronously by other components. In other embodiments, the worker threads may initiate both the metadata modifications and the data modifications.

In one embodiment, if the destination service level of a given transition utilizes delayed-access storage, the worker threads may be responsible for requesting that the object data be written to the delayed-access storage device, and as a result a write I/O may be queued in a delayed-I/O queue 704 associated with the delayed-access storage. (Note that FIG. 11 does not illustrate delayed-I/O queues; the waiting-for-execution and in-progress lists or queues shown in FIG. 11 are distinct from the delayed-I/O queues of FIG. 7.) However, at least in some embodiments, the worker threads may not be responsible for confirming that the write actually succeeded (recall that the writes may take minutes or even hours, depending on the implementation of the delayed-access storage). In such embodiments, after an I/O to write a storage object's data (or a portion of a storage object's data) to the delayed-access storage has been placed in the delayed-I/O queue 704, the corresponding transition task (in the in-progress task list 1146) may be considered complete. In other embodiments, the transition tasks may be considered "in-progress" (and may be retained in the in-progress list 1146) until the write to the delayed-access storage completes.

In different embodiments, depending on the nature of the source and destination service levels, the division of work between the transition task dispatcher and worker threads may vary. For example, consider a transition in which the destination service level uses a different set of erasure coding parameters than the source service level, so that the work required for transitioning a given storage object may include reconstituting the original data of the object, re-computing the fragments based on the new erasure coding parameters, determining the specific storage devices on which the re-computed fragments are to be stored, writing the newly computed fragments, and modifying the object metadata. In some embodiments, the worker threads may be responsible for all of these operations, while the task dispatcher may be responsible simply for saving an indication of the transition and an identifier of the storage object in the waiting-for-execution task list. In other embodiments, some of the operations may be performed by the task dispatcher, while the others (such as writing the modified metadata and/or the re-computed data fragments) may be the worker thread's responsibility.

Worker threads may report the status of the transition operations (e.g., whether the transition succeeded or failed) to transition task dispatcher 1170 (arrow 1163) in some embodiments. In some embodiments, the dispatcher 1170 may periodically check the status of various transition operations, e.g., by pinging or communicating with the worker threads.

Tasks that are completed successfully may be discarded; tasks that did not succeed within a threshold amount of time may be placed back in the waiting-for-execution task lists in some embodiments, e.g., by the transition task dispatcher 1170 or by worker threads. After modification operations to implement transitions for all the candidates of a given job have been initiated, the transition task dispatcher 1170 may initiate the deletion of the job object itself from container 1110 (arrow 1161) in the depicted embodiment. In other embodiments, other components (such as the transition job generators, which may also be configured to examine transition job containers 1110 for expired or eligible-for-deletion job objects) may be responsible for initiating deletion of job objects.

In the illustrated embodiment, the operations of the transition job generators 1130, the transition task dispatchers 1170, and/or the worker threads 1113, may all be asynchronous and independent of the operations of the other components. For example, a transition job generator 1130, when considering whether to include an object 133 as a candidate for a transition in a job Jk, may not be concerned whether a previously-generated job Jf already indicates that same object as a candidate for the same transition, and whether a transition task dispatcher has already assigned resources for Jf's candidates or not. Similarly, the transition task dispatcher may not be concerned about when the last discovery iteration was initiated, or when the next discovery iteration is going to be scheduled, or whether a given job object being validated or assigned resources contains candidates that are also in another job. Worker threads 1113 may simply be configured to process the tasks in a particular waiting-for-execution queue, without any consideration of the iterations of the job generator or task dispatcher. This type of pipelining or loose coupling between the various components may allow for cleaner, less complex implementations than if the various components needed to be aware of the operations and/or status of each other.

FIG. 12 illustrates example elements of a lifecycle policy that may be specified by a client using a programmatic interface, according to at least some embodiments. As indicated above, in some embodiments a web server 1102 may be configured to receive transition policy definitions from clients 905. In the embodiment depicted in FIG. 12, a client 905 may use a PUT request 1202 transmitted in accordance with a REST-style programmatic interface to define a lifecycle policy to be stored in the storage service for some set of objects for which the client has the required authorization. The depicted PUT request may be submitted using HTTP 1.1, as indicated near the top of the example request shown in FIG. 12, directed to an endpoint "lcservicename.webserver.com" on a particular date indicated in the request. As shown, the request may include a signature in an "Authorization" field, which may be validated by the web server or by a different, authorization-related component of the storage service in various embodiments.

The lifecycle policy definition may indicate a number of service levels, as well as transition rules between various service levels in the depicted embodiment. Each transition rule may be enforced on, or applied to, corresponding sets of objects indicated in the rule. In the illustrated example, three service levels with respective identifiers "1", "2" and "3", and respective durability levels "99.999999" (i.e., 99.999999%), "99.9999" and "99.99", are indicated.

A transition rule with an identifier "xxxx" applies to objects whose identifiers or keys begin with the string "prefix1/abc" is shown in FIG. 12. The prefixes may be specified relative to a bucket (e.g., bucketname.servicename.webserver.com) in some embodiments, and the rule may apply to all the objects whose keys match the specified prefix. A "Status" element in a rule definition may be used to indicate whether the rule is to be enabled as soon as possible (e.g., using the keyword "Enabled" as shown) or is merely to be stored in the service for later activation (in which case a different keyword such as "Disabled" may be used instead). An entry labeled "From-servicelevel" indicates the source service level for the transition rule (the service level with identifier "1" in this example) and an entry labeled "To-servicelevel" indicates the target service level (the service level with identifier "3" in this example). Different types of transition criteria may be specified in the PUT requests for each rule—for example, for rule "xxxx", the keyword "ElapsedTimeSinceCreation" is used to indicate that the transitions are to be performed based on time elapsed since object creation. For criteria such as the one illustrated in FIG. 12 that are based on elapsed times, the time units (e.g., "Days" or "Weeks") and the count (e.g., "365" for "Days") may also be included in the PUT request.

Methods for Implementing Lifecycle Policies

Figure 13:
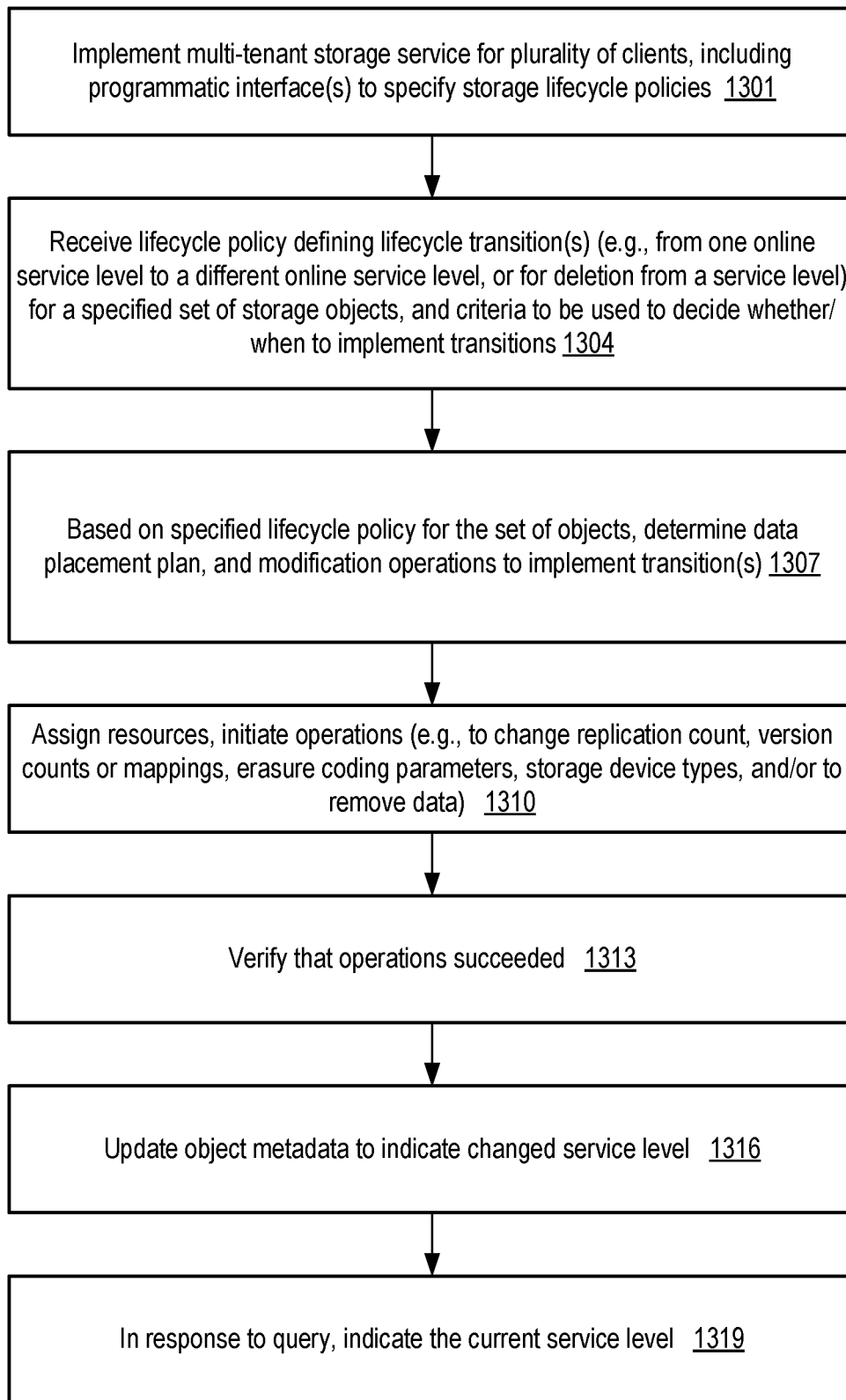
FIG. 13 is a flow diagram illustrating aspects of operations performed to implement lifecycle policies in a storage service, according to at least some embodiments.

FIG. 13 is a flow diagram illustrating aspects of operations performed to implement lifecycle policies in a storage service, according to at least some embodiments. As shown in element 1301, a multi-tenant storage service 102 may be implemented for a plurality of clients. At least in some embodiments, a lifecycle manager 180 or some other component of the service may provide one or more programmatic interfaces (such as web pages or APIs) enabling authorized clients to specify lifecycle policies 120. As shown in element 1304, an indication of a lifecycle policy 120 defining one or more transitions for a specified set of storage objects 133 may be received, e.g., via one of the programmatic interfaces. The policy 120 may indicate one or more lifecycle transitions requested for the storage objects, e.g., transitions between a first and a second online service level with different levels of data durability or availability, or between service levels supporting different ranges of I/O access times (e.g., milliseconds to seconds for a read in one storage level, versus minutes or hours for a read in a different service level employing delayed-access storage), or between a particular service level and a deletion of the objects from the storage service. The policy 120 may include criteria to be used to decide when or if the transitions are to be implemented, e.g., based on various factors such as the time that the objects have spent in their current service levels, the age (time since creation) of the objects, the time since a last modification or access of the objects, the frequency of object modifications or accesses, the relative cost to the client of retaining the storage objects in a service level, and so on.

The lifecycle manager 180 may determine whether to accept or reject the lifecycle policy, e.g., based on validating the syntax and/or verifying that the requested transitions can be performed and/or that the client has the requisite authorization permissions. In some embodiments, the lifecycle manager 180 may be responsible for checking whether the policy indicated by the client conflicts with (e.g., by specifying a different transition for the same criteria and the same set of storage objects) other pre-existing lifecycle policies, and if so, either resolving the conflict (e/g., by indicating the nature of the conflict to the client) or rejecting one of the policies. In at least some embodiments, lifecycle policies that are approved may be enforced without requiring additional guidance or instruction from the clients that created them; in other embodiments, a client may explicitly activate or deactivate policies (e.g., using the logical equivalent of setting the "Enabled" keyword shown in FIG. 12) that have been accepted by the service.

Depending on the criteria, not all the objects specified in a given policy may be eligible for transitions at the same time in some embodiments—e.g., the policy may specify a container name "/xyz" to indicate that the policy is to be applied to storage objects within that container, and an elapsed time "T" since object creation as a criterion for a lifecycle transition, but different objects in the/xyz container may be created at different times, and as a result only a subset may be eligible for transition at a given point in time.

For a given lifecycle policy 120 that has been accepted and is to be enforced, the lifecycle manager 180 may be configured to identify one or more candidate storage objects, from among the objects specified in one or more transition rules or criteria of the policy, that are eligible for a lifecycle transition in accordance with the rules. For those identified candidates, the lifecycle manager 180 may determine a data placement plan in accordance with the transition rule(s) in the depicted embodiment (element 1307). The data placement plan may, for example, include such information as the number of logical or physical replicas of the storage objects' data to be maintained in the target service level, the types of storage devices on which the data is to be stored, the specific devices or addresses at which the data is to be stored, and so on. In at least some embodiments, a schedule for modification operations to be performed for the transitions may also be developed. In some embodiments, the schedule may indicate the order in which various modification operations for the set of candidate objects should be initiated, relative to the other modification operations, instead of the absolute times at which the operations are to be performed or completed, for example.

The lifecycle manager 180 may assign one or more resources (such as, for example, worker threads, slots in a job or task queue, or CPU time slots) to initiate or perform the modification operations and/or any additional operations that may be needed (such as mathematical transforms of data fragments for erasure coding) for the transitions (element 1310). The operations may then be initiated using the assigned resources. In some embodiments, the lifecycle manager 180 may be configured to verify that the operations succeeded (element 1313). In some implementations, the operations may be retried for at least some number of attempts if they do not succeed initially. Object metadata (such as keymap entries) may be updated to reflect the changed service level (or deletion) of the storage objects for which the transition succeeded (element 1316). In some embodiments, the current service level or status of the objects may be provided to clients in response to queries (element 1319), e.g., via one or more programmatic interfaces implemented by the storage service.

Figure 14:
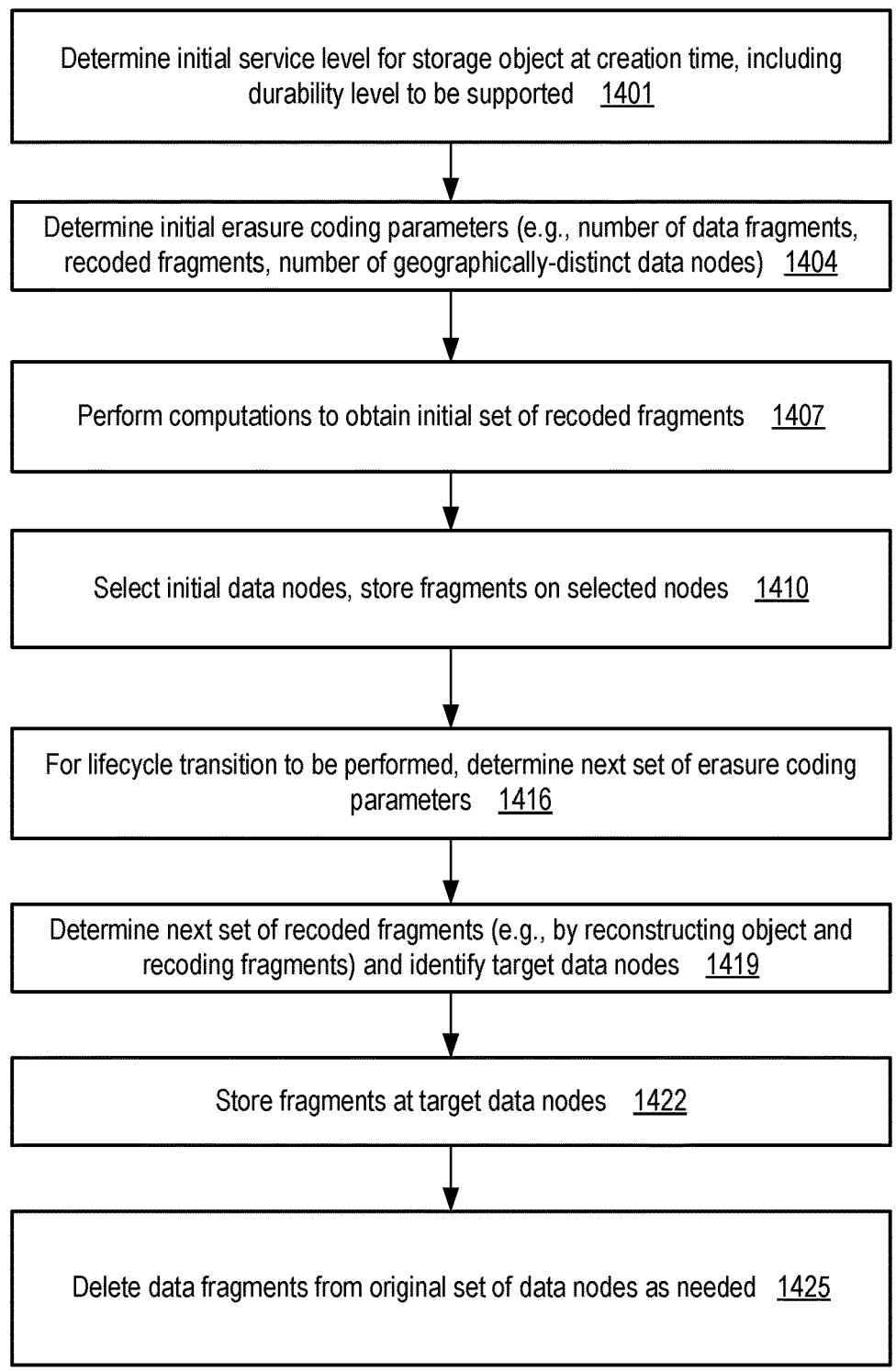
FIG. 14 is a flow diagram illustrating aspects of erasure coding operations that may be performed on storage objects that undergo transitions based on lifecycle policies, according to at least some embodiments.

As described earlier, in at least some embodiments source and destination service levels of a given lifecycle transition specified in a lifecycle policy may differ in the erasure coding parameters used. FIG. 14 is a flow diagram illustrating aspects of erasure coding operations that may be performed on storage objects 133 that undergo transitions based on such lifecycle policies, according to at least some embodiments. As indicated in element 1401, when a storage object 133 is initially created, e.g., as a result of a put operation requested by a client, the initial service level (including, e.g., the initial durability level) for the object may be determined by the storage service. In some embodiments a default service level may be provided if a client does not indicate a specific service level at the time of object creation, while in other embodiments, the programmatic interface(s) available to clients for object creation may enable clients to choose from one of several supported service levels, or define a service level. In the embodiment depicted in FIG. 14, the service may determine the initial erasure coding parameters (e.g., the number of recoded data fragments to be stored, the number of fragments required for reconstituting the object, the number of geographically distinct data nodes to be used for the fragments, and so on) for the storage object (element 1404). The computations required to determine the recoded fragments to be stored in accordance with the initial service level may then be performed (element 1407). The initial set of data storage devices or nodes may be identified, and the fragments may be written to those nodes (element 1410).

At some later time, the lifecycle manager 180 may determine, e.g., based on a lifecycle policy 120 to be applied to the storage object, that the storage object is eligible or due for a lifecycle transition to a destination service level. Accordingly, the lifecycle manager 180 may determine a second set of erasure encoding parameters for the destination service level (element 1416). In some embodiments, a storage object representing the lifecycle policy may explicitly include the erasure coding parameters for the service levels for which transitions are indicated in the policy. In other embodiments, the lifecycle manager 180 may be configured to dynamically compute the erasure coding parameters of the destination service level, based for example on the characteristics (e.g., durability, availability, and the like) of the destination service level and/or on current conditions in the storage service (e.g., resource utilization levels, network traffic levels, space availability at different sets of storage devices, and the like). The set of recoded fragments for the destination service level may be determined (e.g., by reconstituting the original object and performing the necessary computations and repartitioning operations), and the target data nodes may be identified (element 1419). The selection of the target storage devices or nodes may be dependent for example on current or anticipated resource usage levels at various data centers in some embodiments. The data fragments recomputed in accordance with the destination service level's erasure coding parameters may then be stored on the selected storage devices or nodes (element 1422). In at least some embodiments, deletion of the original data fragments corresponding to the source service level may be initiated (element 1425). Metadata for the storage object may be modified to indicate the destination service level in at least some embodiments.

As indicated earlier, full replication may be considered an example of erasure coding, with only one (full) "fragment" needed to reconstitute the original object. Accordingly, the operations illustrated in FIG. 14 apply to embodiments in which service level transitions involve changing the number of full replicas of the storage object's data, e.g., from M replicas in the original service level to N replicas in the destination service level. In at least some embodiments in which the destination service level is implemented using delayed-access storage, replication and/or erasure coding may be used in combination with the delayed-access storage. In other embodiments, only a single un-fragmented copy of an object's data may be stored in delayed access storage (although this may also technically be considered an extreme case of erasure coding).

Figure 15:
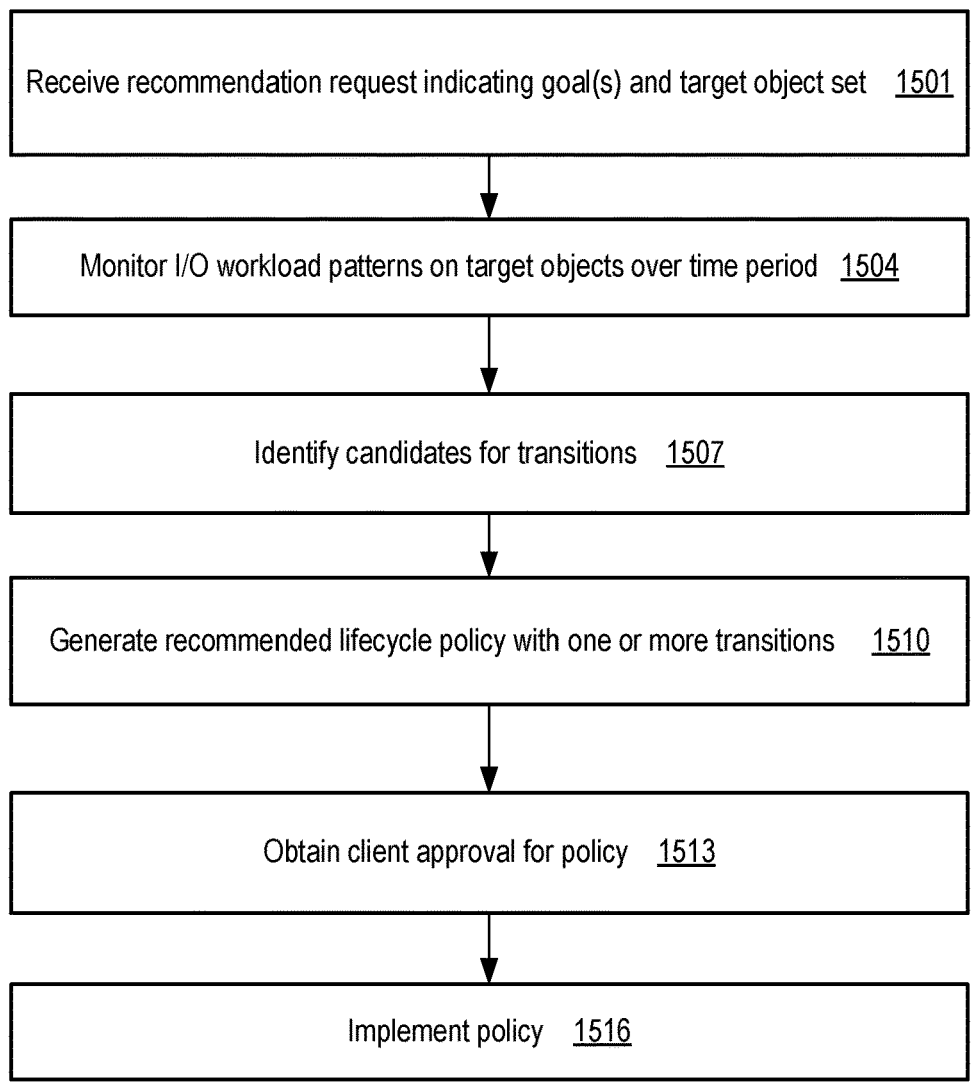
FIG. 15 is a flow diagram illustrating aspects of operations performed at a storage service in response to requests for lifecycle transition recommendations, according to at least some embodiments.

In some embodiments, a client may be faced with storage budget constraints or other high-level targets, and may wish to obtain recommendations from the storage service 102 as to how best to achieve those targets. The storage service 102 may be able, for example, to analyze the client's object set (e.g., the sizes of the client's storage objects, their usage patterns, and/or their geographical distribution) and identify lifecycle policies and/or specific lifecycle transitions to help the client. FIG. 15 is a flow diagram illustrating aspects of operations performed at a storage service in response to requests for lifecycle transition recommendations, according to at least some embodiments. As shown in element 1501, a recommendation request may be received from a client, indicating one or more client goals or constraints (such as budget limits). In some embodiments, the recommendation request may include an indication of a set of objects for which recommendations are to be identified; in other embodiments, all the storage objects owned by the client may be considered eligible for recommendation analysis.

The storage service 102 may monitor I/O workload patterns on the target objects over time (element 1504), and/or retrieve pre-existing metrics on the workloads over some earlier time periods. Based on the information gathered on the workload patterns, some subset of the client's storage objects may be identified as candidates for lifecycle transitions (element 1507). For example, some objects that have not been accessed or modified for a year or more may be considered suitable for delayed-access storage, other objects that are only rarely accessed may be considered suitable for a transition to a lower-availability service level, or some number of older versions of a storage object may be considered suitable for a transition to a lower-cost, lower-performance service level. The storage service may generate a recommended lifecycle policy with one or more suggested lifecycle transitions (element 1510) in the depicted embodiment. The transitions may be specified as one-time transitions for a specified set of storage objects in the policy, or a more general policy to be applied whenever similar workload characteristics are identified may be proposed. The client's approval for the policy may be obtained (element 1513) and the policy may be implemented (element 1516), e.g., using any combination of the techniques described above, such as erasure coding or delayed-access storage.

Figure 16:
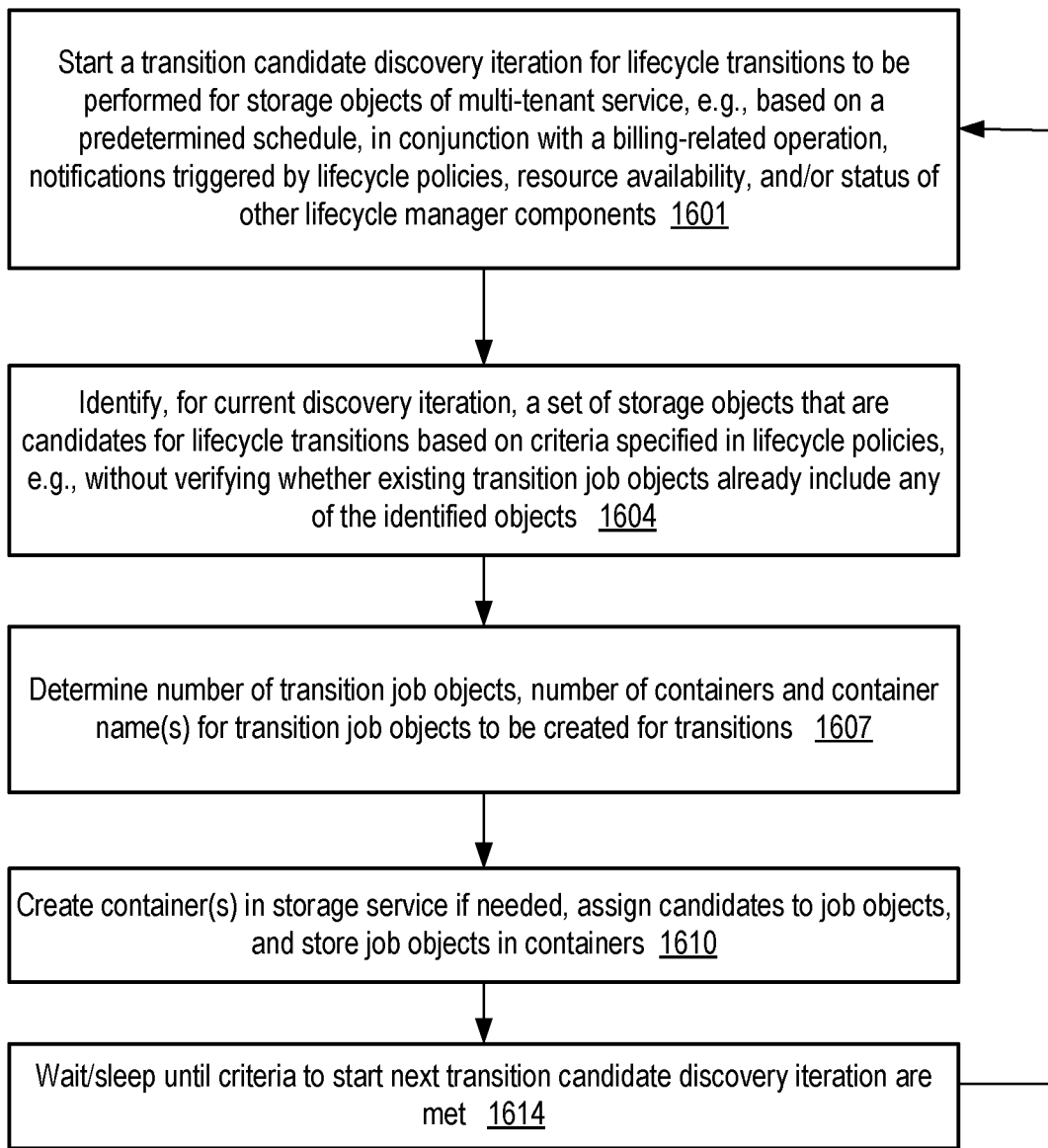
FIG. 16 is a flow diagram illustrating aspects of operations that may be performed by a transition job generator configured to perform iterations of transition candidate discovery operations, according to at least some embodiments.

As mentioned earlier, in at least some embodiments lifecycle transitions may be implemented using a pipelined architecture. According to one such architecture, different components of the lifecycle manager may be configured to perform their operations in respective iterations or cycles of activity, followed by inactive or dormant periods, and the iterations of a given type of component may be initiated independently of the iterations of other types of components. FIG. 16 is a flow diagram illustrating aspects of operations that may be performed by a transition job generator component 1130 of a lifecycle manager, configured to perform iterations of transition candidate discovery operations, according to at least some embodiments. As shown in element 1601, the transition job generator 1130 may be configured to start a candidate discovery iteration based on any combination of several factors, such as a predetermined schedule (e.g., a candidate discovery iteration may be scheduled for 2:00 AM every night), or as part of a billing-related operation (e.g., the storage service may periodically schedule billing analyses in which it determines how many storage objects a client has, what the sizes of the objects are, and how many read and/or write operations the client performed on the objects, and the job generator may perform candidate discovery in conjunction with a billing analysis that is already scheduled). In some embodiments candidate discovery runs may be scheduled based at least in part on resource availability metrics, e.g., such iterations may be initiated only if the foreground I/O workload is below a threshold. In one implementation, when a new lifecycle policy is accepted for implementation by the storage service 102, one or more notifications may be scheduled (e.g., using a messaging service or a notification system available in the provider network used for the storage service) to trigger at least the initial candidate discovery iteration for the policy. In some implementations, candidate discovery iterations may be initiated based on the status of other components of the lifecycle manager—e.g., based on a determination that the task dispatcher has been inactive for X hours, or that an execution iteration of the task dispatcher was completed Y hours ago.

The job generator 1130 may identify, during the candidate discovery iteration, a set of storage objects 133 that are candidates for lifecycle transitions based on one or more transition criteria of the types described above (e.g., based on elapsed time since object creation, last modification or access, frequency of object modification or access, pricing, etc.) (element 1604 of FIG. 16). In at least some implementations, the job generator 1130 may not be configured to verify whether any existing transition job objects already include any of the candidates that it identifies, and as a result, it may be the case that more than one job object may list the same transition candidate in the depicted embodiment. Having identified the transition candidates, the job generator 1130 may determine the total number of job objects to be generated, the number of logical containers into which the job objects are to be distributed, and the names, identifiers or keys of the containers and the jobs (element 1607). In some implementations, a limit (which may be a tunable parameter) on the number of transition candidates that should be included in a job may be enforced, which may determine the number of job objects to be generated. In at least some embodiments, a priority-based naming policy may be used for naming the logical containers and/or the job objects themselves, so that for example sorting the jobs in accordance with priority may be enabled. In one implementation, the priority of a set of jobs may be indicated by including a timestamp in the name of a logical container in which the job is stored, where the timestamp may for example indicate a time at which the candidate discovery iteration was performed or initiated, or a target completion time for the transition operations for the candidates indicated in the job. In such an implementation, an earlier timestamp may indicate a higher priority. In other implementations, priority may be indicated more directly in the names of the containers or the job objects, e.g., using explicit priority values or levels.

The job generator 1130 may create the containers if they do not already exist, assign the transition candidates to the job objects, and store the job objects in the containers (element 1610). In some embodiments, new containers may be created in each iteration; in other embodiments, containers may be reused for multiple iterations. Various techniques may be used to assign transition candidates to jobs, to assign job objects to containers, and/or to determine the order in which candidates are listed within a given job object in different embodiments. In some implementations, transition candidates may be randomly distributed among job objects, while in other implementations, factors such as locality may be used for assigning candidates to jobs. In some embodiments, a given job object may only comprise transition candidates for a particular kind of transition (e.g., one job J1 may be used to list candidates transitioning from service level S1 to service level S2, another job J2 may be used to list candidates transitioning from service level S2 to S3, and so on). In other embodiments, a given job object may list candidates for several different types of transitions, in which case the nature of the transition for each of the candidates may be indicated in the job. In one embodiment, multiple instances of the transition job generator 1130 may be implemented, with each instance configured to identify candidates for a particular kind of transition. In some embodiments, the transition job generator may be implemented using a plurality of threads of execution searching for candidates in parallel, and creating job objects in parallel. After the job objects with respective transition candidate lists have been stored in the containers, the job generator 1130 may enter a sleep state or a dormant state until criteria to start the next discovery iteration are met (element 1614), and the operations illustrated in elements 1601 onwards may then be repeated for the next iteration.

Figure 17:
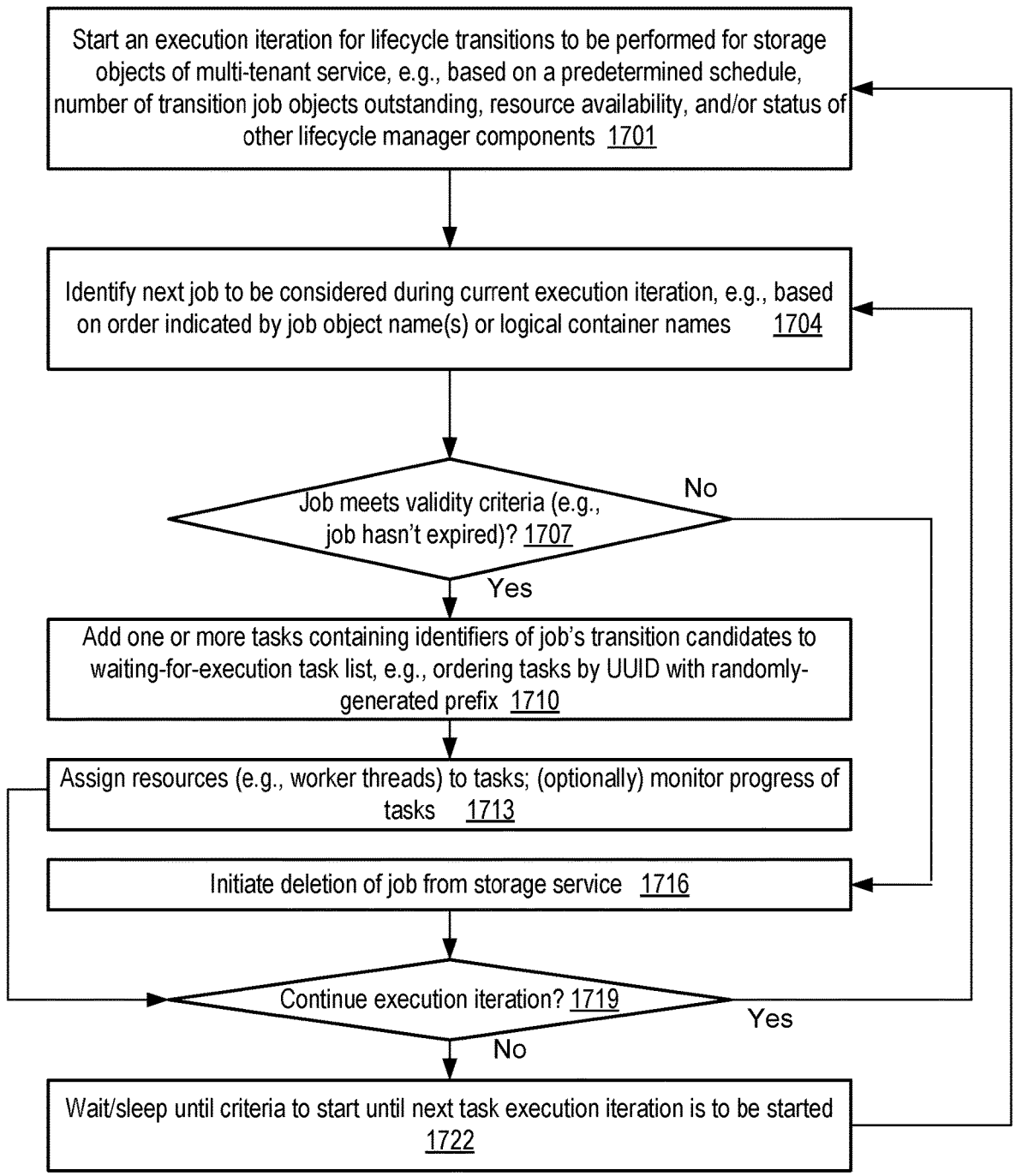
FIG. 17 is a flow diagram illustrating aspects of operations that may be performed during execution iterations of a transition task dispatcher, according to at least some embodiments.

FIG. 17 is a flow diagram illustrating aspects of operations that may be performed during execution iterations of a transition task dispatcher, according to at least some embodiments. As shown in element 1701, an execution iteration may be started based on various criteria, such as a predetermined schedule, a determination that the number of transition job objects for which transitions have not yet been scheduled has reached a threshold, resource availability (e.g., based on CPU utilization levels at computing devices at which worker threads are to run), or based on status of other components of the lifecycle manager (e.g., based on an indication that a candidate discovery iteration was completed X hours ago). During a given task execution iteration, the dispatcher 1170 may be configured to identify the next job object to be considered. The order in which job objects are selected may be based at least in part on the logical container names and/or the job names or keys selected by the job generator in the depicted embodiment—e.g., the priority indicators used for naming may also be used for determining the order. The dispatcher may check whether the job object meets one or more validity criteria (element 1707)—for example, in one implementation, a job expiration period may be enforced according to which only jobs that have been generated in the last X hours or days are to be considered valid, while older jobs are to be rejected as invalid. If the job object is valid, one or more tasks containing identifiers or keys of the candidates indicated in the job object may be inserted in a waiting-for-execution task list 1145 (element 1710).

In some embodiments where each job object may list candidates for several different types of transitions, the transition type may also be indicated in the tasks created by dispatcher 1170. In one embodiment, separate waiting-for-execution lists may be organized for each type of transition—e.g., one such list may be created for transitions from service level S1 to service level S2, another list for transitions from service level S2 to service level S3, and so on; in other embodiments, transitions of several different types may be included in a given task. In some implementations a universally-unique identifier (UUID) may be generated for each task, e.g., with a randomly-generated prefix, and the UUID may be used to select the position within the waiting-for-execution list at which the task is inserted. In some implementations all the transition candidates of a given job object may be included in a single task, while in other implementations the candidates of a given job may be distributed among multiple tasks, or the candidates of multiple jobs may be included within a single task. Some of the factors used to determine the job-to-task ratios may include the nature of the transitions, the responsiveness of worker threads, the rate of success/failures of previously-generated tasks, and the like, in various implementations. In one embodiment, tasks (unlike job objects) may be temporary or in-memory objects that are not stored as persistent, first-class objects 133 within the storage service. A task may comprise a pointer or identifier of the corresponding job(s) in some implementations. The task dispatcher may be configured to assign resources, such as worker threads, to the tasks as needed in the depicted embodiment (element 1713). For example, as described below, a worker thread may be assigned a particular task, or be notified that tasks on a given waiting-for-execution list are available, in response to a get-task request in some implementations. In some embodiments, resources other than worker threads, such as CPU time slots, may be assigned instead of or in addition to worker threads. In at least some embodiments, the task dispatcher may optionally be configured to monitor the progress of the tasks corresponding to a job object, e.g., by pinging or communicating with the worker threads, and/or by receiving task completion indications from the worker threads, as described below.

If the job object was rejected on the basis of the validity criteria (as also determined in element 1707), the deletion of the job object itself from the storage service may be initiated (element 1716) in the depicted embodiment. In some embodiments, the duration of a given execution iteration may be limited to a certain amount of time, while in other embodiments, the iteration may be allowed to continue until all the outstanding jobs have been examined. If, after assigning the resources (or rejecting the job as invalid), the iteration is to continue (as determined in element 1719), and job objects remain to be examined, the next job object may be selected, and the operations corresponding to elements 1704 onwards may be repeated for the next job object. Otherwise, the transition task dispatcher may be configured to wait or sleep until criteria to start the next iteration are met (element 1722), after which the operations illustrated in elements 1701 onwards may be repeated.

Figure 18:
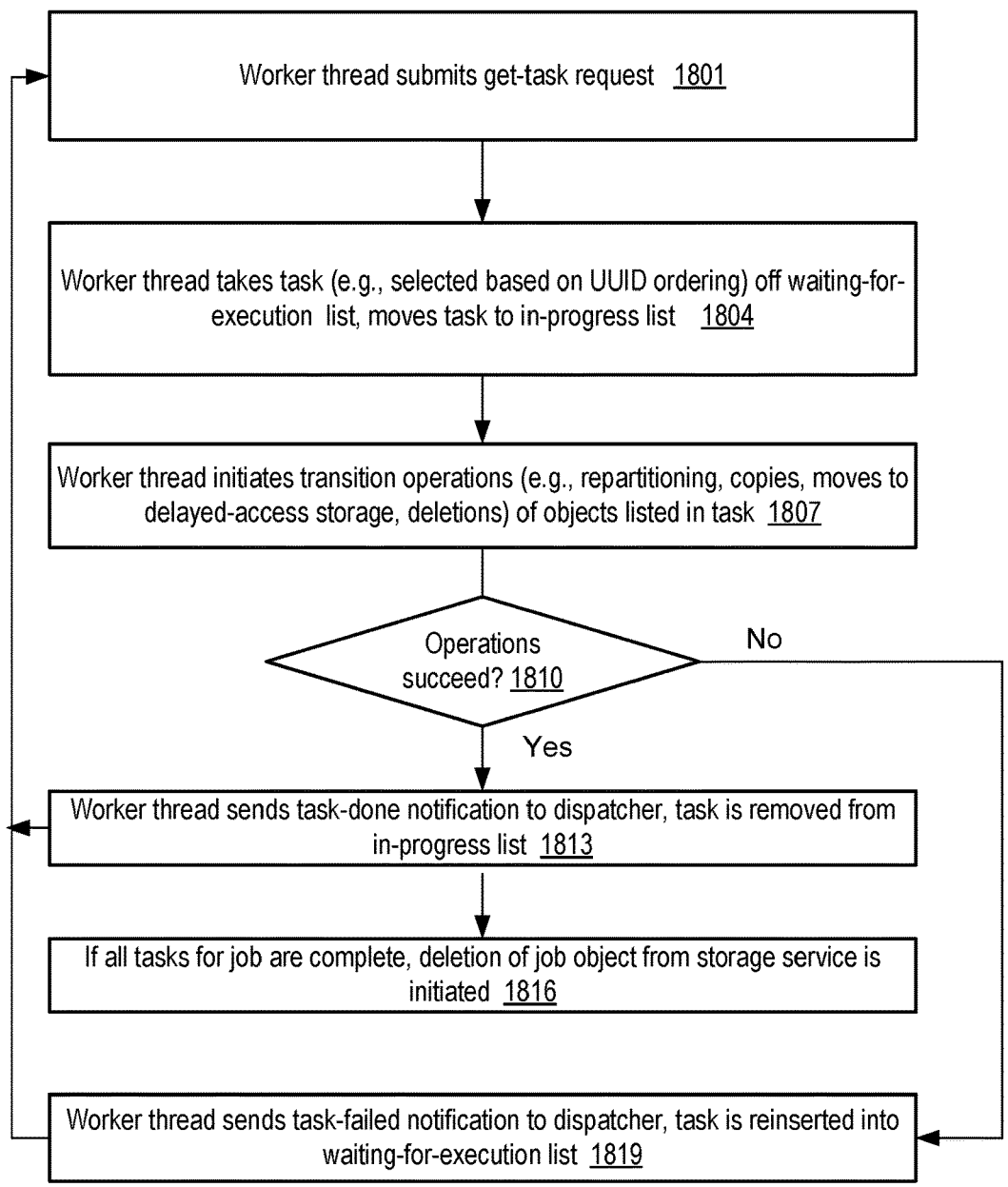
FIG. 18 is a flow diagram illustrating aspects of operations that may be performed by a worker thread configured to initiate modification operations for object lifecycle transitions, according to at least some embodiments.

FIG. 18 is a flow diagram illustrating aspects of operations that may be performed by a worker thread 1113 configured to initiate data and/or metadata modification operations for object lifecycle transitions, according to at least some embodiments. As shown in element 1801, a worker thread 1113 in the depicted embodiment may submit a get-task request to the task dispatcher 1170. The task dispatcher 1170 may respond by assigning a particular task or by identifying a particular waiting-for-execution list 1145 from which the worker thread is expected to pick the next task for execution. The worker thread 1113 may take the task off the waiting-for-execution list and place the task in an in-progress list (element 1804). In some embodiments, as noted above, UUIDs generated by the task dispatcher may be used to order the tasks in the waiting-for-execution list(s), and hence the order in which the worker thread takes the tasks off the list(s). The worker thread may then initiate transition operations on the data and/or metadata for storage objects 133 indicated in the task (element 1807). The nature of the operations may differ based on the transition. For example, in some embodiments in which erasure coding is being used, a worker thread may reconstruct an object's data based on the source service level's erasure coding parameters, repartition the object data into fragments based on the destination service level's erasure coding parameters, determine the destination storage devices or nodes, initiate write operations for the re-coded fragments to the nodes, and/or initiate metadata modification operations for the storage object to indicate the service level changes. If delayed-access storage is being used in the destination service level of the transition, a worker thread may enqueue one or more I/O operations in one or more delayed-I/O queues 704. If straightforward replication is being used and the number of replicas is being changed as part of the transition, write operations for the additional replicas (or deletion operations for the replicas to be removed) may be initiated. For transitions involving deletions of storage objects, the worker thread may initiate write operations to delete the metadata and/or data of the storage object; for transitions that do not involve deletions, writes to update metadata such as keymap entries may be initiated. In some embodiments a quorum may be required for the modifications initiated by the worker threads to be considered successful, as described earlier.

If all the transition operations for a given task succeed (as determined in element 1810), the worker thread 1113 may send a task-done notification to the task dispatcher 1170, and the task may be removed from the in-progress list and deleted (element 1813). If all the tasks for a given job object are completed, the deletion of the job object from the storage service may be initiated, e.g., by the task dispatcher 1170 (element 1816) that was monitoring the progress of the transitions indicated in the job. If at least some of the operations attempted by the worker threads failed, the worker thread may send a task-failed notification to the task dispatcher 1170 (element 1819). The task dispatcher may re-insert the task into the waiting-for-execution list in some embodiments, so that it may eventually be assigned again to a worker thread. In some implementations, the contents of the failed task may be modified before it is reinserted into the waiting-for-execution list, e.g., if the task identified several transition candidates and some of the corresponding transitions succeeded while others failed, those candidates whose transitions succeeded may be removed. After the worker thread has processed a task, in the depicted embodiment the worker thread may again submit a get-task request (regardless of whether the task it was assigned completed successfully or not), and the operations of elements 1801 onwards may be repeated. When the execution iteration ends, in some embodiments the worker thread may also enter a dormant or sleep state until the next iteration starts. In some implementations the task dispatcher may be configured to ping or otherwise communicate with each worker thread periodically to ensure that the worker thread remains active, and if such a communication results in a determination that the worker thread is unresponsive, the task assigned to that thread may be reinserted into the waiting-for-execution list.

As noted earlier, in at least some embodiments, metadata and/or data of storage objects 133 may be replicated at various nodes of service 102, some of which may be geographically dispersed. Depending on the synchronization mechanisms in use in such embodiments, at least at some points in time, not all the copies of the metadata or data may be identical. Thus, it may be possible in such distributed environments that a client makes a change to a lifecycle policy applicable to storage objects at one or more logical containers or buckets, and an indication that the requested change has succeeded is provided to the client, but the change does not get propagated to all the nodes at which metadata about the policy and/or containers is maintained. Given the asynchronous and pipelined approach to implementing lifecycle policies described above, without special precautions being taken, it may at least in theory be possible that a lifecycle manager component attempts to perform operations for a transition indicated in a lifecycle policy, after the policy has been changed or invalidated by a client. If a no-longer-valid or no-longer-applicable lifecycle transition is attempted in such a scenario, data loss may result (e.g., if the transition involved deletion), or the client's billing amounts for storage (which may be a function of the service levels indicated in the transition) may be affected in an undesirable or unexpected manner. Accordingly, in at least some embodiments, the lifecycle manager 180 may be configured to use sequence numbers (such as lifecycle policy assignment sequence numbers 422 shown in FIG. 4A, and policy modification sequence numbers 210 shown in FIG. 2) to reduce the likelihood of invalid transition operations.

Figure 19:
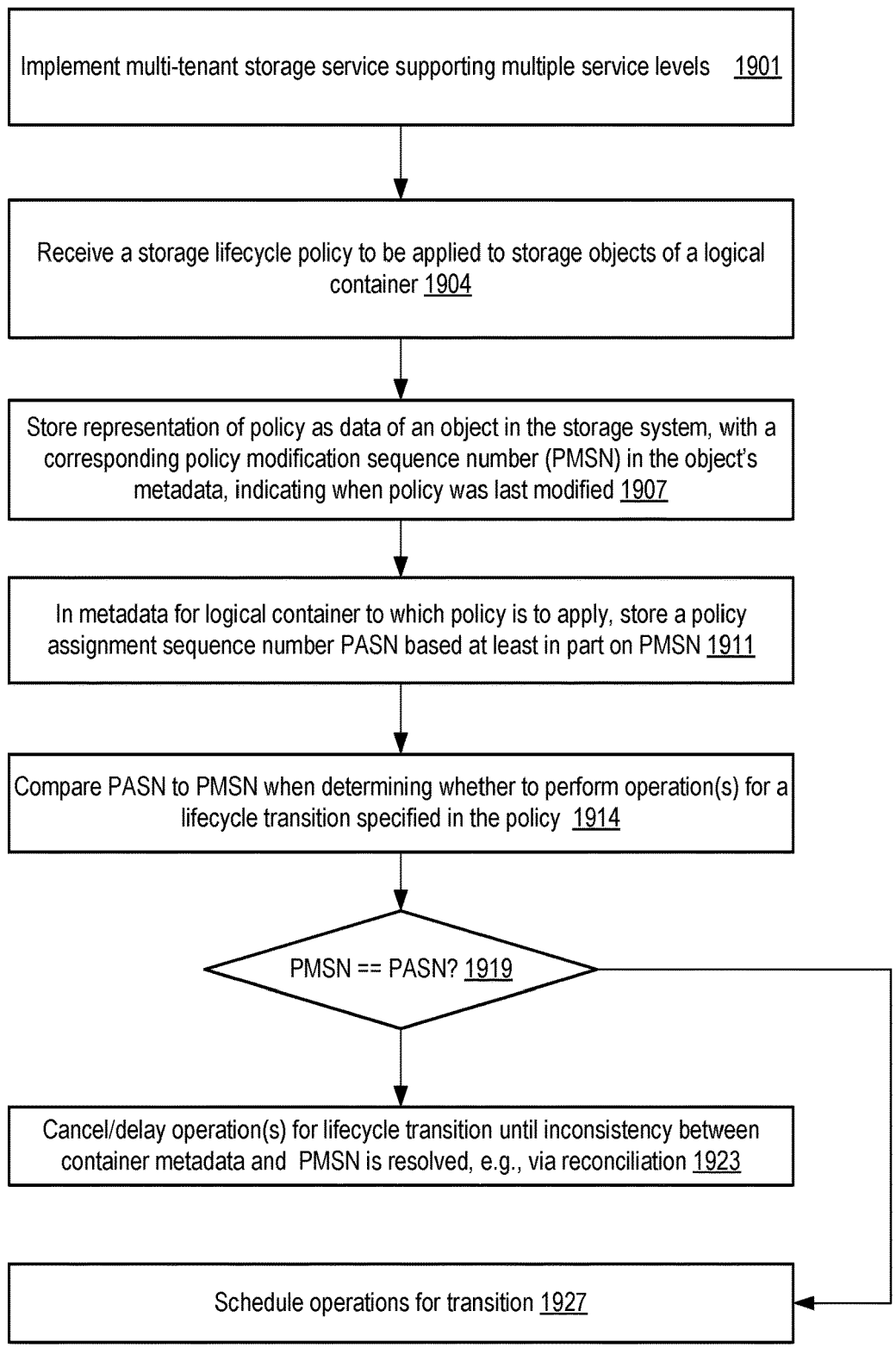
FIG. 19 is a flow diagram illustrating aspects of operations that may be performed to prevent invalid or out-of-date lifecycle transitions, according to at least some embodiments.

FIG. 19 is a flow diagram illustrating aspects of operations that may be performed using sequence numbers to prevent invalid or out-of-date lifecycle transitions, according to at least some embodiments. As shown in element 1901, a multi-tenant storage service supporting transitions between multiple service levels for storage objects may be implemented. A lifecycle policy 120 to be applied to a set of storage objects of a logical container (such as a bucket 320, or a lower-level container within a bucket) may be received, e.g., via a programmatic interface implemented in the storage service, from a client that owns the storage objects or the container (element 1904). A representation of the policy may be stored as the data of a first-class object within the storage service 102 (element 1907), e.g., as a data component of an additional object with similar metadata and interfaces as are provided for client-created objects that are not related to lifecycle management in the storage service 102. The new object created for the policy may be stored in a different logical container than the logical containers to which the policy is to be applied, in at least some embodiments. The policy may define (or refer to) various service levels, and rules or criteria to be used to move objects between the service levels may be specified as described above. A policy modification sequence number (PMSN) 210 may be stored as part of the metadata of the object in which the policy is stored, indicating when the most recent modification to the policy occurred. Initially, the creation of the policy may be considered its most recent "modification"; later, if and when the client modifies the policy, the PMSN may be updated. The techniques described earlier for sequence number generation in general may be used for the PMSN as well in the depicted embodiment. For example, the PMSN may be based on a timestamp (derived from either a local clock time at a computing device implementing a service component, or from a global clock maintained by the service). In one implementation, a 64-bit number or a 128-bit number may be used as a sequence number, with some bits (such as the N most significant bits) of each sequence number being set to the number of seconds or milliseconds since a reference point in time (e.g., Jan. 1, 1970 at midnight, Greenwich Mean Time, a reference time employed by many versions of Unix and Linux), and other bits being generated at random.

The metadata for the logical container to which the policy is to apply may also be modified in the depicted embodiment, e.g., by storing a pointer or identifier of the policy (such as policy ID 418 of FIG. 4A) and a policy assignment sequence number PASN 422 therein (element 1911). The PASN 422 may be based at least in part on the PMSN 210 in some embodiments, e.g., the PASN may initially be set equal to the PMSN in some implementations. In at least some embodiments, the creation of a policy in response to a client's request, and the application of the policy to any desired set of the client's storage objects, may be independent events that occur at different times—e.g., there may be no requirement that a policy be applied to any storage objects at the same time at which the policy is created. Different APIs may be supported for policy creation, policy application (or application cancellation, as when a client indicates that a policy that was being applied to a logical container is no longer to apply), policy modification, and/or for reading policies in some such embodiments.

At some point after the lifecycle has been applied to the container, the lifecycle manager 180 may identify candidate objects for the transitions indicated in the policy, e.g., using the pipelined approach described above, in which a job generator component of the lifecycle manager performs iterations of candidate discovery. In some embodiments, before deciding whether a particular storage object in the logical container is to be listed as a transition candidate, the lifecycle manager 180 may compare the PMSN of the policy being applied and the PASN in the logical container's metadata. If the PMSN does not match the PASN, this may indicate that the container metadata and the policy metadata are not in sync with each other, and in at least some embodiments the lifecycle manager may determine not to list the storage object as a candidate until the discrepancy is resolved (e.g., as a result of update propagation similar to that illustrated in FIG. 10A, or reconciliation similar to that illustrated in FIG. 10B). In other embodiments, the job generator component may not be configured to compare the PASN and the PMSN. In one embodiment, the job generator may include storage objects as candidates in a transition job object even if the PMSN and the PASN do not match, but may also store an indication in the job object that a discrepancy has been detected, to serve as a hint to other components (such as a transition task dispatcher or a worker thread) to later check whether the discrepancy still exists before performing modification operations.

In at least some embodiments, a transition task dispatcher component of the lifecycle manager 180, and/or a worker thread assigned to a particular transition of a transition candidate storage object, may be configured to compare the PMSN and the PASN when determining whether to perform a modification operation for a lifecycle transition (element 1914). In some embodiments, if the PMSN and the PASN match (as determined in element 1919), the operation may be performed (element 1927); and if the PMSN and the PASN do not match, the operation may be canceled or delayed until the discrepancy is resolved (e.g., via update propagation or reconciliation) (element 1923). In one embodiment, any combination of the components of the lifecycle manager 180—e.g., transition job generators, transition task dispatchers and/or worker threads—may be configurable to perform the PMSN-to-PASN comparisons for a given set of objects being considered for lifecycle transitions, and to cancel or delay their operations if an inconsistency or discrepancy is found. The operations that are delayed or canceled may include, for example, operations to list storage objects of the logical container in transition job objects as candidates for transitions (in the case of transition job generators), operations to list storage objects of the logical containers as tasks in waiting-for-execution task lists (in the case of transition task dispatchers), metadata or data modification operations such as erasure-coding related operations including repartitioning or computing recoded fragments, object replication operations, operations to enqueue I/Os for delayed-access storage devices, or any other operations that various lifecycle manager components may be expected to perform to support lifecycle transitions in various embodiments.

It is noted that in various embodiments, some of the operations shown in the flow diagrams of FIG. 10A, 10B, 13, 14, 15, 16, 17, 18 or 19 may be omitted or performed in a different order than that shown. In at least some embodiments, at least some of the operations shown in the flow diagrams may be performed in parallel instead of sequentially; for example, both the transition job generator 1130 and the transition task dispatcher 1170 may be implemented as multi-threaded applications in some implementations. Multiple instances of the various components of the storage service 102 may be implemented in various embodiments. Any combination of appropriate types of storage device technologies, storage hardware, storage software and/or storage protocols may be used to store data and metadata for storage objects 133 in various embodiments, including any of various types of disks, disk arrays, disk appliances, flash memory devices, tape devices, and the like.

Use Cases

The techniques described above, of supporting lifecycle transitions of storage objects in multi-tenant storage services based on user-specified lifecycle policies, may be useful for numerous clients whose data sets continue to grow over time, potentially resulting in avoidable expenses for unused or rarely-used storage objects. The ability of the storage service to provide usage-based recommendations for lifecycle transitions to achieve specific client goals, such as meeting storage budgets, may be especially useful for large clients whose storage objects display a wide variety of usage patterns. The overhead associated with lifecycle transitions, and the impact on foreground client operations, may both be minimized using the pipelined, asynchronous architecture of the job generators and the task dispatchers described herein. The use of sequence numbers to avoid unintended transitions may help reduce the probability of data loss and may also reduce the likelihood of unexpected billing charges for clients.

Illustrative Computer System

Figure 20:
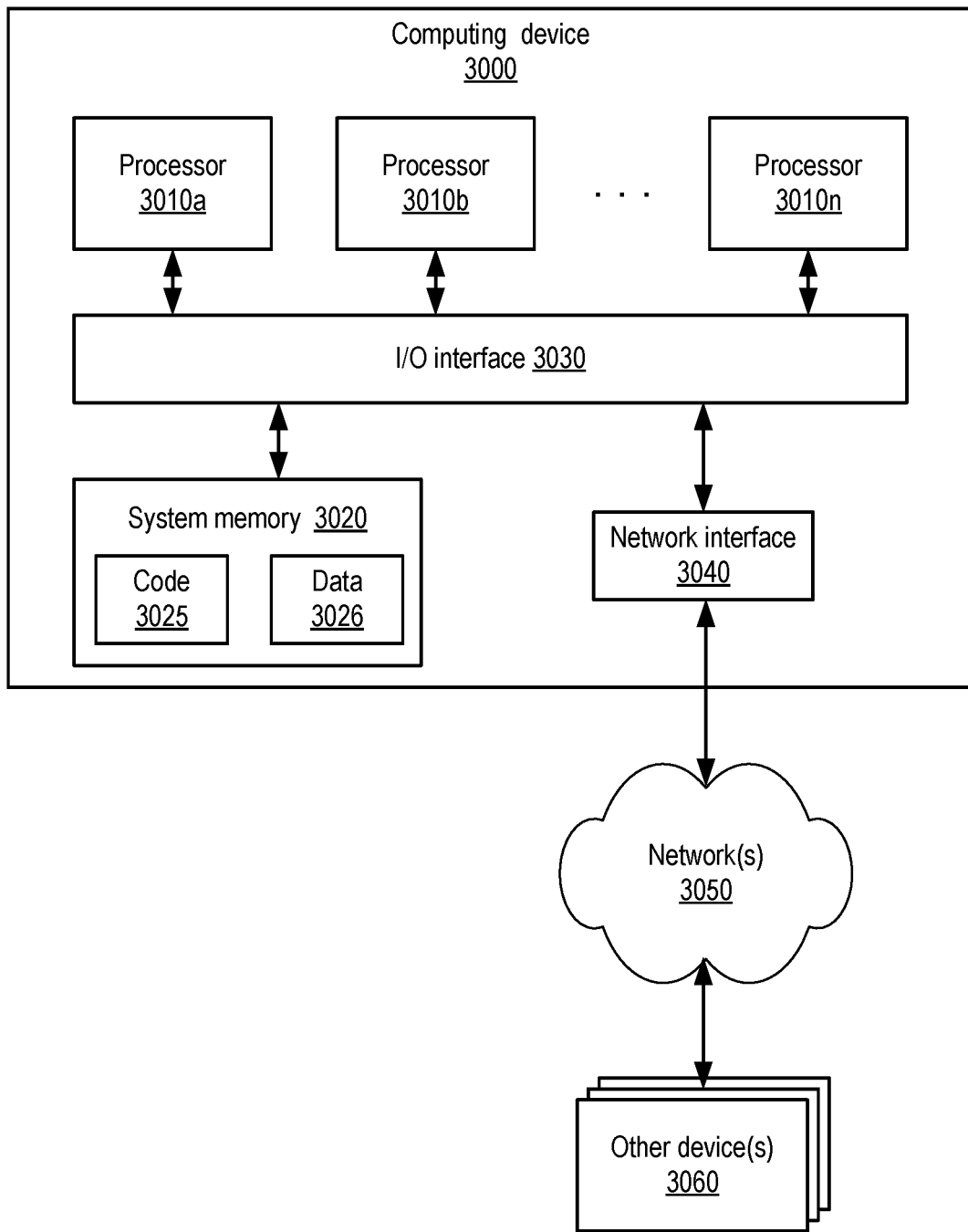
FIG. 20 is a block diagram illustrating an example computing device that may be used in at least some embodiments.

In at least some embodiments, a server that implements a portion or all of one or more of the technologies described herein, including the techniques to implement the various components of a storage service 102, may include a general-purpose computer system that includes or is configured to access one or more computer-accessible media. FIG. 20 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 19, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 19 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 20 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
   determining a lifecycle policy for a storage object of a collection of storage objects of a storage service based at least in part on metadata for the collection indicating a policy assignment sequence number for the lifecycle policy and that the lifecycle policy applies to the storage object when stored as part of the collection, wherein the lifecycle policy comprises an indication of a lifecycle transition of the storage object, wherein the lifecycle transition comprises a transition from a first service level to a second service level, wherein the first service level and the second service level each, respectively, comprise at least one of:
      a durability level,
      an availability level,
      a performance level indicating expected latencies for storage operations, or any combination thereof;
   determining whether the lifecycle transition is valid based at least in part on a comparison of the policy assignment sequence number and a policy modification sequence number indicating a most recent modification of the lifecycle policy;
   initiating, based at least in part on a determination that the lifecycle transition is valid, a modification operation associated with the storage object in accordance with the lifecycle policy;
   verifying that the modification operation has succeeded; and
   providing, in response to a query, an indication of a current service level of the storage object.

2. The method of claim 1, wherein the durability level indicates a probability of permanent data loss, and wherein the availability level indicates an amount of time which the storage object is expected to be inaccessible over a particular time period.

3. The method of claim 1, wherein the first service level and the second service level each further comprise a replication level, the method further comprising:
   storing a first number of replicas of at least a portion of data of the storage object based on a first replication count corresponding to the replication level of the first service level; and
   storing a second number of replicas of at least a portion of data of the storage object based on a second replication count corresponding to the replication level of the second service level, wherein the first number and the second number are different.

4. The method of claim 3, wherein the replicas comprise physical replicas of the storage object.

5. The method of claim 3, wherein the replicas comprise logical replicas of the storage object.

6. The method of claim 1, further comprising:
storing at least a portion of data of the storage object a first set of erasure coding parameters in accordance with a first set of coding parameters corresponding to the durability level of the first service level; and
storing the at least a portion of data of the storage object in accordance with a second set of erasure coding parameters corresponding to the durability level of the second service level.

7. The method of claim 1, wherein the performance level of the first service level further indicates an expected transition time for transitioning to the second service level.

8. A system, comprising:
one or more processors; and
a memory storing instructions that, when executed by the one or more processors, cause the one or more processors to:
determine a lifecycle policy for a storage object of a collection of storage objects of a storage service based at least in part on metadata for the collection indicating a policy assignment sequence number for the lifecycle policy and that the lifecycle policy applies to the storage object when stored in the collection, wherein the lifecycle policy comprises an indication of a lifecycle transition of the storage object, wherein the lifecycle transition comprises a transition from a first service level to a second service level, wherein the first service level and the second service level each, respectively, comprise at least one of:
a durability level,
an availability level,
a performance level indicating expected latencies for storage operations, or
any combination thereof;
determine whether to perform a modification operation associated with the storage based at least in part on a comparison of the policy assignment sequence number and a policy modification sequence number indicated in metadata for the storage object;
initiate the modification operation associated with the storage object in accordance with the lifecycle policy in response to a determination that the policy assignment sequence number matches the policy modification sequence number;
verify that the modification operation has succeeded; and
provide, in response to a query, an indication of a current service level of the storage object.

9. The system of claim 8, wherein the instructions further cause the one or more processors to:
determine a data placement plan for at least a portion of data of the storage object in accordance with the lifecycle transition.

10. The system of claim 9, wherein the instructions further cause the one or more processors to:
determine the modification operation in accordance with the data placement plan.

11. The system of claim 8, wherein the instructions further cause the one or more processors to:
store a first number of replicas of at least a portion of data of the storage object based on a first replication count corresponding to the durability level of the first service level; and
store a second number of replicas of at least a portion of data of the storage object based on a second replication count corresponding to the durability level of the second service level.

12. The system of claim 8, wherein a transition criterion corresponding to the lifecycle transition is based at least in part on one or more of: (a) an elapsed time since the storage object was created (b) an elapsed time since the storage object was last modified (c) an elapsed time since the storage object was last read (d) a frequency of access of the storage object, or (e) a cost of retaining the storage object in the first service level.

13. The system of claim 8, wherein the instructions further cause the one or more processors to:
generate, in response to a recommendation request indicating a client goal and a set of candidate storage objects, one or more lifecycle transition recommendations based at least in part on (a) the client goal and (b) the usage metrics associated with one or more candidate storage objects of the set.

14. A non-transitory, computer-readable storage medium storing instructions that, when executed by one or more processors, cause the one or more processors to:
determine a lifecycle policy for a storage object of a collection of storage objects of a storage service based at least in part on metadata for the collection indicating a policy assignment sequence number for the lifecycle policy and that the lifecycle policy applies to the storage object when stored in the collection, wherein the lifecycle policy comprises an indication of a lifecycle transition of the storage object, wherein the lifecycle transition comprises a transition from a first service level to a second service level, wherein the first service level and the second service level each, respectively, comprise at least one of:
a durability level indicating a probability of permanent data loss of the storage object,
an availability level indicating an amount of time which the storage object is expected to be inaccessible over a particular time period,
a performance level indicating expected latencies for storage operations,
a replication level indicating a number of replicas of the storage object to be stored, or
any combination thereof;
determine whether to perform a modification operation associated with the storage based at least in part on a comparison of the policy assignment sequence number and a policy modification sequence number indicated in metadata for the storage object;
initiate the modification operation associated with the storage object in accordance with the lifecycle policy in response to a determination that the policy assignment sequence number matches the policy modification sequence number;
verify that the modification operation has succeeded; and
provide, in response to a query, an indication of a current service level of the storage object.

15. The non-transitory, computer-readable storage medium of claim 14, wherein the instructions further cause the one or more processors to:
store a first number of replicas of at least a portion of data of the storage object based on a first replication count corresponding to the replication level of the first service level; and store a second number of replicas of at least a portion of data of the storage object based on a second replication count corresponding to the replication level of the second service level.

16. The non-transitory, computer-readable storage medium of claim 14, wherein the performance level of the first service level further indicates response times for the storage operations.

17. The non-transitory, computer-readable storage medium of claim 14, wherein the instructions further cause the one or more processors to:
store at least a portion of data of the storage object a first set of erasure coding parameters in accordance with a first set of coding parameters corresponding to the first service level; and
store the at least a portion of data of the storage object in accordance with a second set of erasure coding parameters corresponding to the second service level.

18. The non-transitory, computer-readable storage medium of claim 14, wherein the instructions further cause the one or more processors to:
generate, in response to a recommendation request indicating a client goal and a set of candidate storage objects, one or more lifecycle transition recommendations based at least in part on (a) the client goal and (b) the usage metrics associated with one or more candidate storage objects of the set.

19. The non-transitory, computer-readable storage medium of claim 14, wherein the instructions further cause the one or more processors to:
divide data of the storage object into a plurality of fragments in accordance with the lifecycle transition; and
transform the plurality of fragments into a second plurality of fragments having a number of fragments different from the plurality of fragments.

20. The non-transitory, computer-readable storage medium of claim 19, wherein the instructions further cause the one or more processors to:
regenerate the data of the storage object based on a subset of the second plurality of fragments.

* * * * *